United States Patent [19]

Leach

[11] 4,148,701

[45] Apr. 10, 1979

[54] HIGH EFFICIENCY ENERGY TRANSFER TECHNIQUE

[76] Inventor: Sam L. Leach, P.O. Box 2536, Palos Verdes Peninsula, Calif. 90274

[21] Appl. No.: 834,682

[22] Filed: Sep. 19, 1977

Related U.S. Application Data

[63] Continuation-in-part of Ser. No. 790,320, Apr. 25, 1977, Pat. No. 4,113,589.

[51] Int. Cl.$^2$ .............................................. B01J 1/10
[52] U.S. Cl. ..................... 204/157.1 R; 204/DIG. 11; 250/527
[58] Field of Search ..................... 204/157.1 R, 158 R; 250/527; 423/657, 658, 584

[56] References Cited

U.S. PATENT DOCUMENTS

| | | | |
|---|---|---|---|
| 1,345,905 | 7/1920 | Abbott | 423/657 |
| 3,443,087 | 5/1969 | Robieux et al. | 204/DIG. 11 |
| 3,904,500 | 9/1975 | Jenson | 204/DIG. 11 |
| 3,969,204 | 7/1976 | Neimann et al. | 204/DIG. 11 |
| 4,045,359 | 8/1977 | Fletcher | 204/DIG. 11 |

OTHER PUBLICATIONS

Steinberg, Advances in Science & Technology, vol. 1 (1962) pp. 309, 312 & 313.

*Primary Examiner*—Howard S. Williams
*Attorney, Agent, or Firm*—Poms, Smith, Lande, Glenny & Rose

[57] ABSTRACT

An apparatus is disclosed for exothermically obtaining hydrogen or hydrogen peroxide from water vapor in a reaction chamber. The separation of the hydrogen and oxygen may be accelerated through the use of a combination host and sensitizer material which is present near spaces or voids within the reaction chamber. The water vapor has certain particular absorption bands in its absorption versus frequency characteristic. Each of the sensitizers which are located adjacent the voids in the reactant, in one embodiment forming part of the walls of small cylindrical tubes, has an energy output in the excited state which is precisely in one of the energy absorption bands in the water vapor characteristic. The host material absorbs heat energy and excites the sensitizer material. In addition to the formation of free hydrogen, some hydrogen peroxide is also formed. Other feedstocks may have energy selectively applied to them.

Alternative appparatus for applying high intensity radiation to feedstock include (1) a reaction chamber in which conductive wires are coated with two different host and sensitizer materials; and (2) a reaction chamber irradiated by beams from two lasers of different frequencies. In both of these apparatus the radiation of two different frequencies beat together as the radiation impinges on the media discontinuities provided by the feedstock and creates new sum and difference frequencies, with the higher sum frequencies providing energetic radiation effects.

32 Claims, 23 Drawing Figures

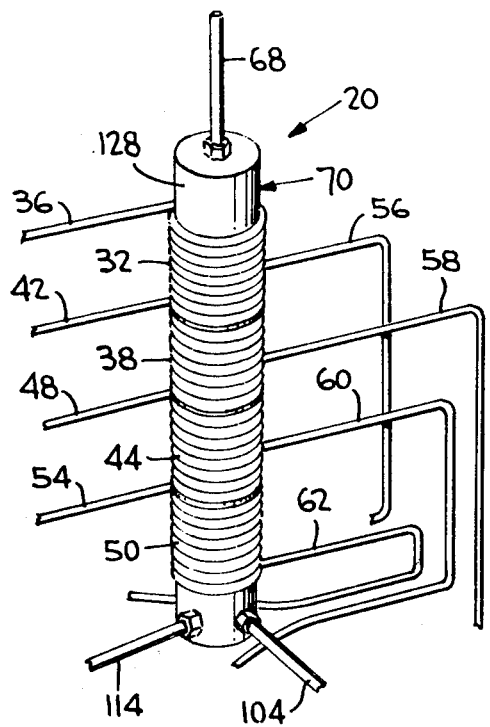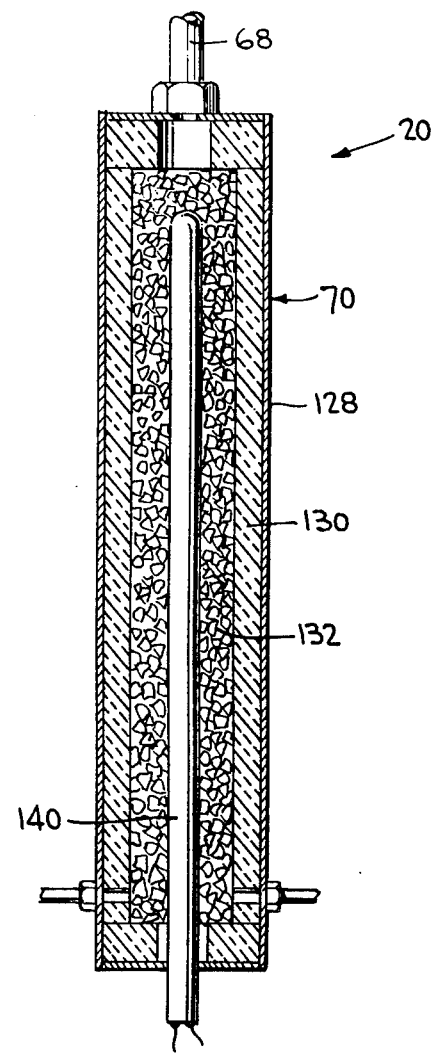

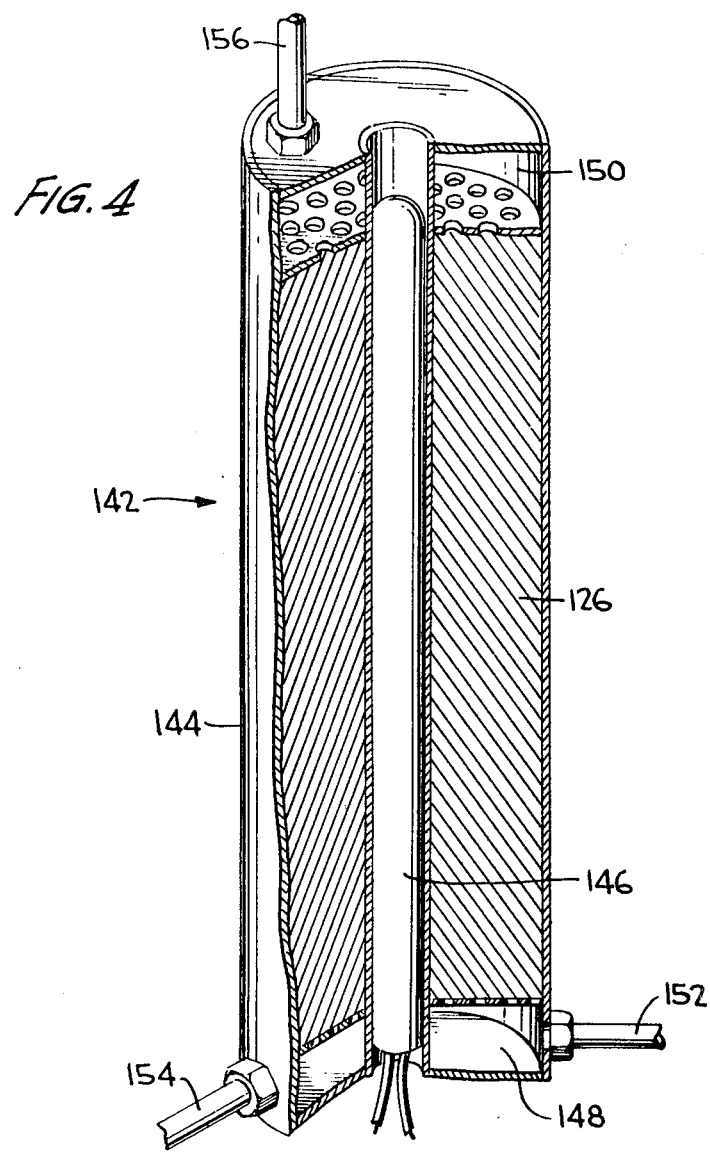

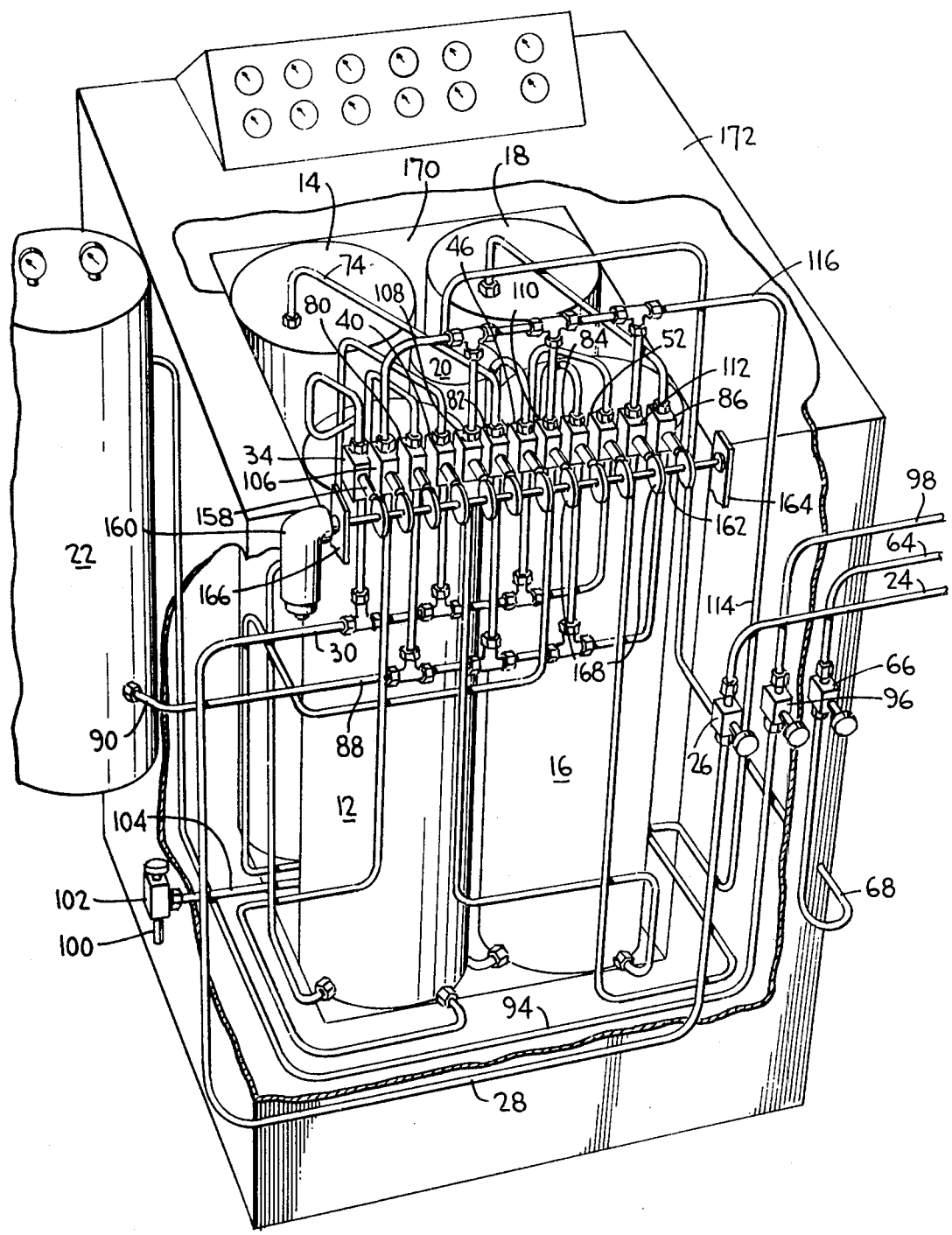

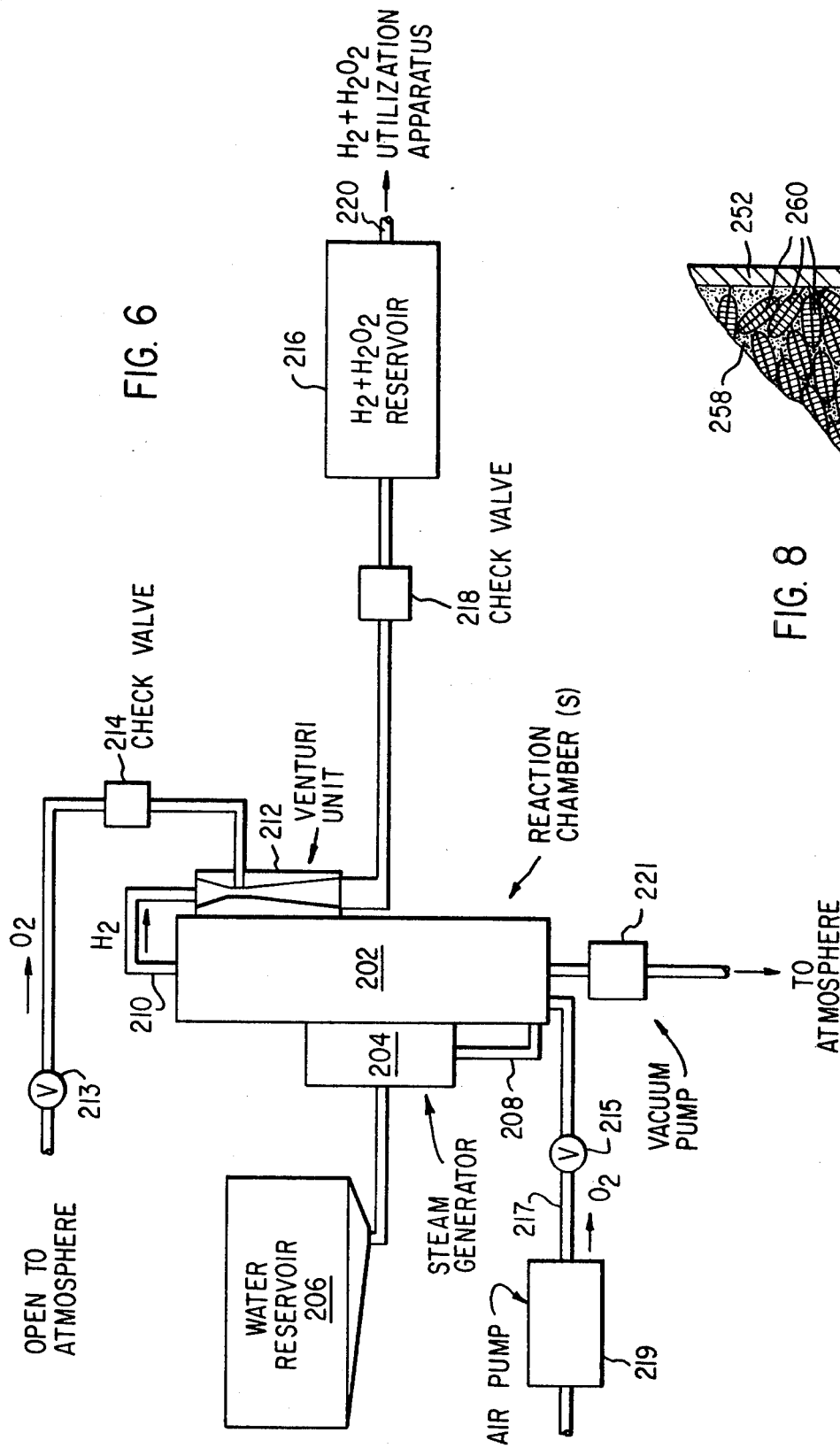

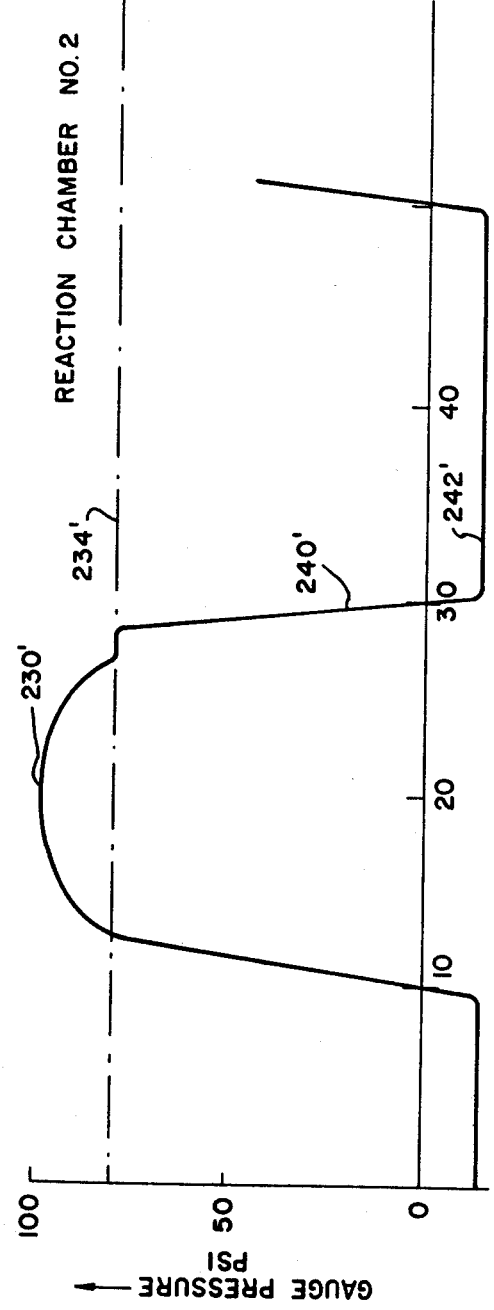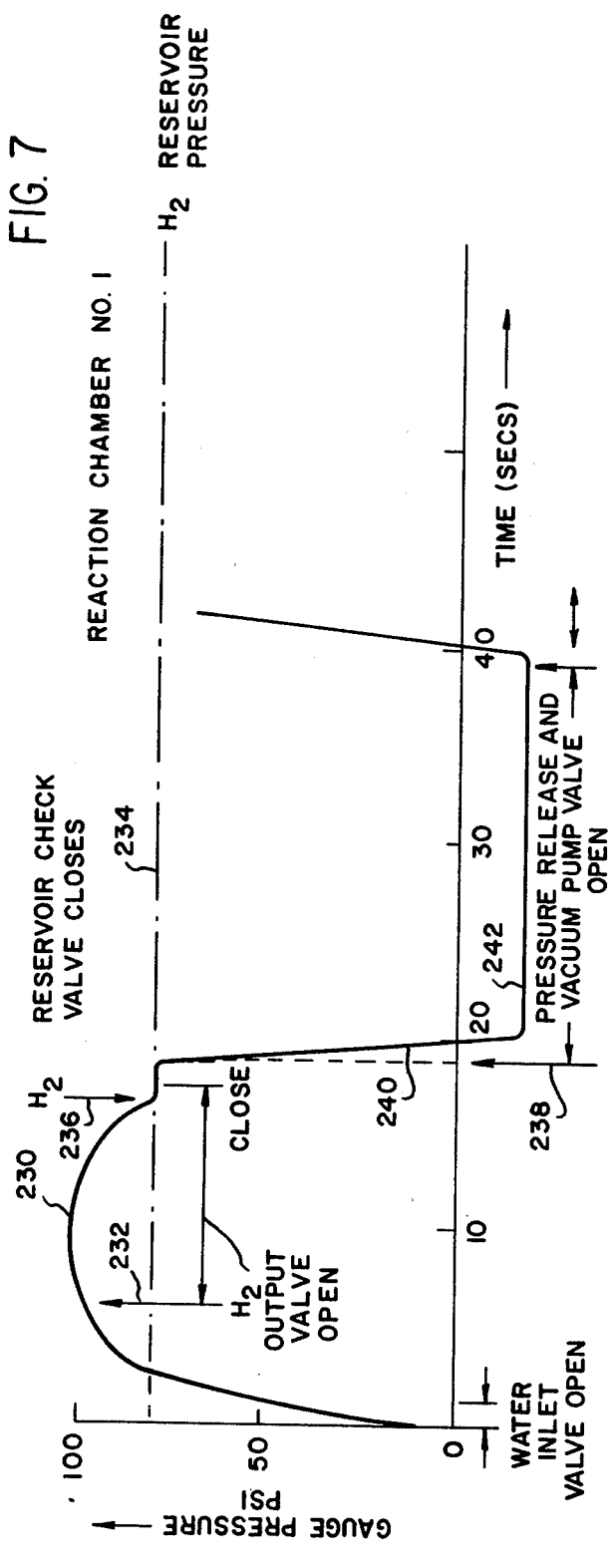
FIG. 7

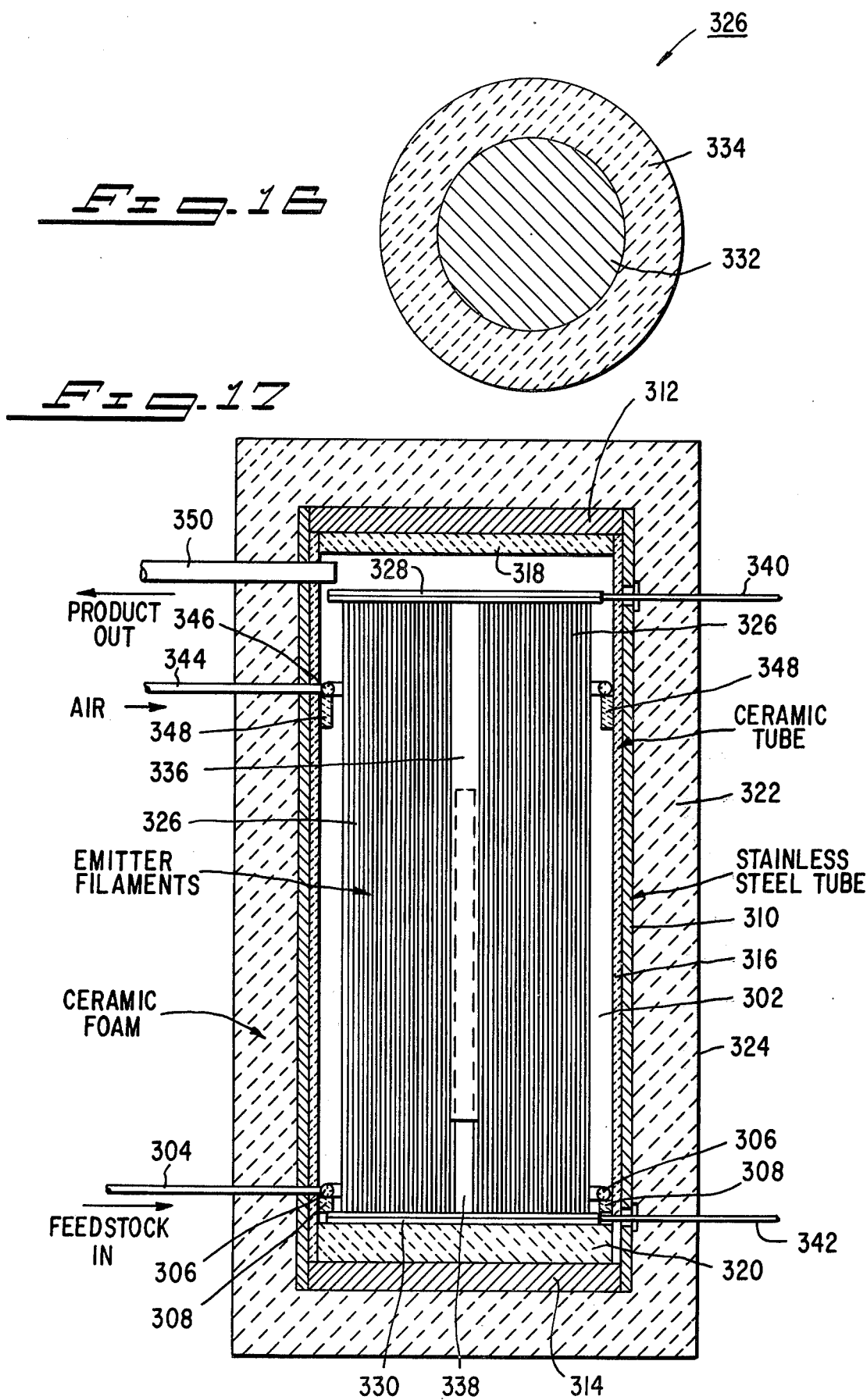

HIGH EFFICIENCY ENERGY TRANSFER TECHNIQUE

This patent application is a continuation-in-part of U.S. patent application Ser. No. 790,320, filed Apr. 25, 1977, now U.S. Pat. No. 4,113,589.

RELATED PATENT APPLICATIONS

The subject matter of the present specification is related to that disclosed in the specification of U.S. Patent application Ser. No. 768,868, filed Feb. 15, 1977, and entitled, "Method and Apparatus for Generating Hydrogen".

BACKGROUND OF THE DISCLOSURE

This invention relates to apparatus and method for increasing the efficiency and amplifying the effectiveness of energy transfer, particularly from a high temperature source of energy.

In the specification of the patent application cited above, an apparatus is described in which hydrogen and/or hydrogen peroxide is formed exothermically from water vapor, using a body of material such as manganese oxide raised to a high temperature to sequester the oxygen from the water vapor. The process takes place at relatively high pressure above about 5 atmospheres, and at a temperature in the order of 1000° Kelvin. After the hydrogen is drawn off at relatively high pressure, a check valve closes, and the oxygen is removed from the manganese oxide at a reduced pressure well below atmospheric pressure, by the use of a vacuum for example.

As the hydrogen is being drawn off from the reaction chamber, the formation of hydrogen peroxide was disclosed, through the use of a venturi unit by which oxygen from the atmosphere was combined at high temperature with the hydrogen.

SUMMARY OF THE INVENTION

In accordance with one limited and specific aspect of the invention, the breakup of the water vapor molecular, $H_2O$, may be accomplished more rapidly and effectively through the use of sensitizer materials and host materials which absorb heat energy from the manganese dioxide or other reactant and radiate energy which is concentrated in the high absorption portions of the absorption versus frequency characteristic of water vapor to break up the water vapor molecule.

This action is enhanced through the use of small cells which form voids throughout the reactant, and which are provided with the special sensitizer and host material around the periphery of the voids. These voids may be produced by wire mesh cells, or by ceramic cylinders having wire mesh at each end, for example, so that the water vapor may readily pass through the cylinders. The wire mesh or the walls of the cylinders contain the special host and sensitizer materials which apply highly concentrated radiation to the water vapor at precisely the frequency bands at which the water vapor absorbs energy. It is also believed that the atomic radiations from the sensitizer material are coherent and thus apply an unusually high level of concentrated radiation to the water vapor. The nature of the phenomena which are involved and several specific examples of host and sensitizer materials both for water vapor and for other feedstocks to which it is desired that energy be applied, will be considered in detail in the body of the present specification.

In addition to accelerating the generation of hydrogen by the application of high levels of energy to water vapor, instead of by sequestering the oxygen in the course of raising manganese oxide to higher oxidation levles, the present apparatus also permits direct formation of hydrogen peroxide after the water vapor molecule is broken up, as this is the preferred combinational form of hydrogen and oxygen at the elevated temperatures and pressures which are present in the reaction chamber.

In accordance with a broader aspect of the invention, an improved technique is provided for increasing the efficiency of application of radiant energy to a feedstock. This is accomplished through the use of the heat reservoir including a mass of material, a wire, or other element heated up to an elevated temperature, and the use of special sensitizer material and host material for absorbing energy from the heat reservoir and for applying energy to the feedstock at precisely those bands in the frequency spectrum at which the feedstock has high absorption to radiant energy. In function, the host material absorbs heat energy from the heat reservoir and applies energy at a specific frequency sufficient to raise the sensitizer material to an excited state. The sensitizer is chosen so that, as it shifts from its excited state to a lower or ground energy state, it radiates energy precisely in the absorption band of the feedstock. By choosing a suitable sensitizer, and exciting it to its upper excitation level, a population inversion of atoms of the sensitizer in the excited state is produced, so that, as certain of these atoms drop to their lower energy states this will coherent radiation from large numbers of these sensitizer atoms with the result that very intense and concentrated radiation impinges on the feedstock precisely at the energy levels to which it is most sensitive.

One particular advantage of the present invention is the increased speed and higher efficiency of energy transfer which is achieved by the use of the host and sensitizer materials. In the specific case of the water vapor, for example, it is not necessary to sequester all of the oxygen; instead, many of the water vapor molecules are broken up, and hydrogen peroxide is immediately formed. If desired, additional oxygen may be brought into the reaction chamber along with the water vapor to provide more complete conversion of the water vapor to hydrogen peroxide.

In accordance with an advantageous feature of certain embodiments of the invention, the application of energy derived from the heated reactant to the feedstock may be accomplished with the feedstock in thermally conductive relationship, but isolated from the chamber in which the reactant is located, so that the feestock may be irradiated continuously, while the reactant is (exothermically) sequestering oxygen from water vapor at a high pressure, and subsequently dissociating the oxygen at a low pressure. The walls of the pipes or other structure for separating the feedstock from the reactant may include the host/senstizer material, or may be transparent to the radiations being directed from the adjacent host/sensitizer material to the feedstock.

In accordance with an additional feature of the invention high efficiency energy transfer to a feedstock may be accomplished by the use of a reaction chamber, including wires coated with host and sensitizer material of the type discussed above, for transforming broad band heat energy into radiation in the specific absorption band of the feedstock, such as steam, which is to be acted upon. The heat energy may be supplied by passing electricity through the coated wires, or by superheating the incoming feedstock, as desired.

In accordance with a further aspect of the invention, two or more different output radiation frequencies may be radiated into the reaction chamber, to interact with each other to produce sum and difference frequencies, interacting with media discontinuities, thereby providing the flexibility to "hit" the feedstock with high energy ultraviolet radiation, for example. This is particularly advantageous when the feedstock has absorption bands in the U. V. frequency spectrum.

This input radiation to the reaction chamber may be provided in several different ways. For example, sets of differently coated wires having radiation characteristics at different frequencies may be employed; and, alternatively, a hollow reaction chamber having highly reflective inner walls may be irradiated by two lasers operating at different frequencies. In each case the selected feedstock would be fed through the reaction chamber under suitable temperature and pressure conditions and the output product would be concurrently drawn off. Again, by matching the radiant energy supplied to the reaction chamber to the absorption characteristics of the feedstock, unusually high efficiencies are achieved.

In accordance with a further feature of the invention, the reaction chamber may be divided into input and output sections. with one type of radiation being especially suitable for initial irradiation of the feedstock, and another frequency or set of frequencies being applied to the output section, with these latter frequencies being selected to avoid adverse effect on the product gases.

A feature of the invention involves the introduction of additional air into the reaction chambers to combine with the hydrogen which is dissociated from water vapor to produce hydrogen peroxide, with the collateral advantage of supplying heat to the reaction chamber from this exothermic reaction.

Other objects, features, and advantages of the invention will become apparent from a consideration of the following detailed description and from the drawings.

BRIEF SUMMARY OF THE DRAWINGS

FIG. 2 is a perspective view of the hydrogen burner/heating means which may be employed as part of the system;

FIG. 3 is a vertical cross-section of the hydrogen burner of FIG. 2;

FIG. 4 is a perspective view partially broken away for illustrative clarity of a reaction chamber used in the present system;

FIG. 5 is a perspective view, also partially broken away, of a complete system illustrating the principles of the present invention;

FIG. 6 is a block diagram of a system illustrating certain principles of the present invention;

Figure 9:
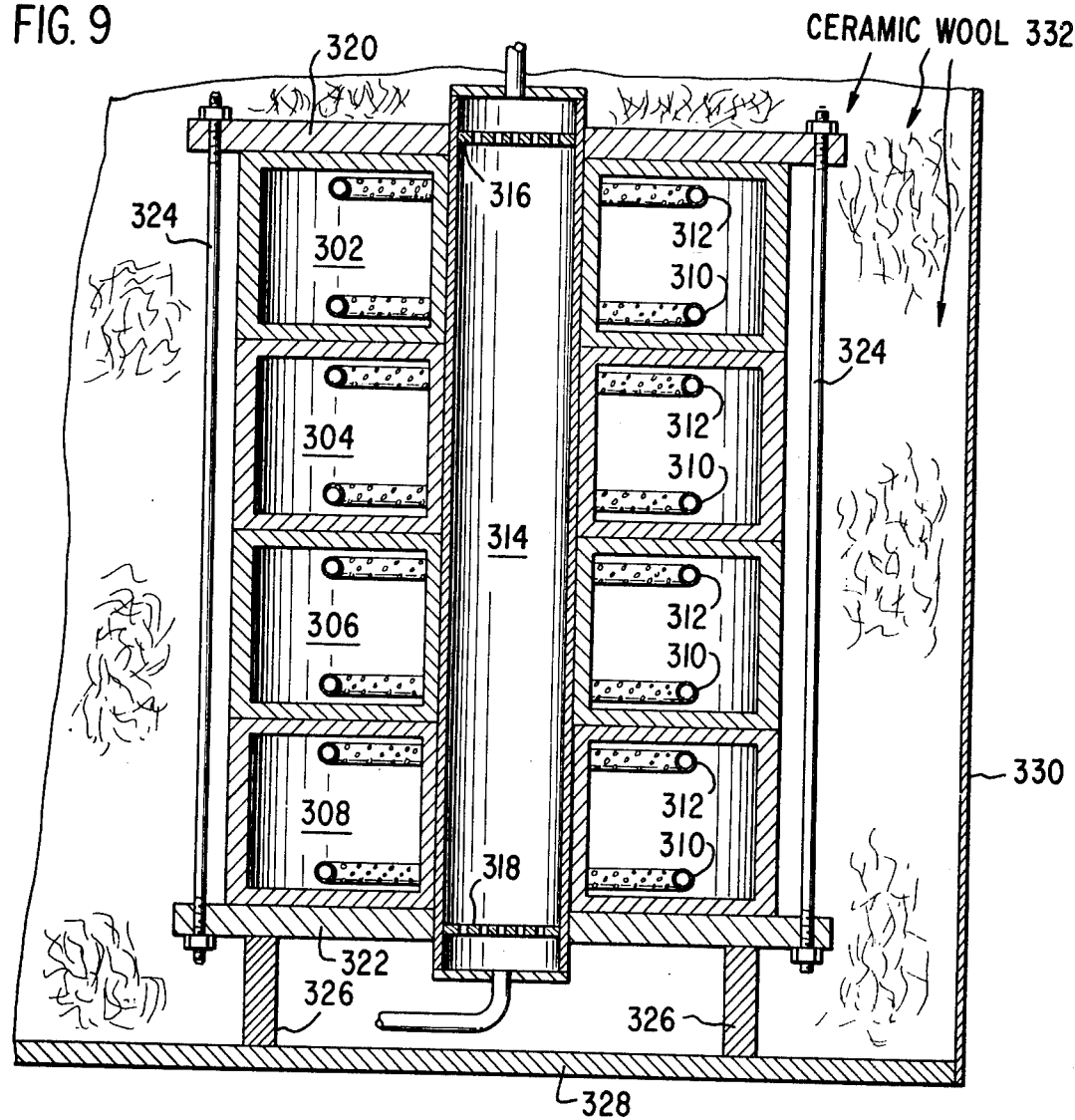
Figure 10:
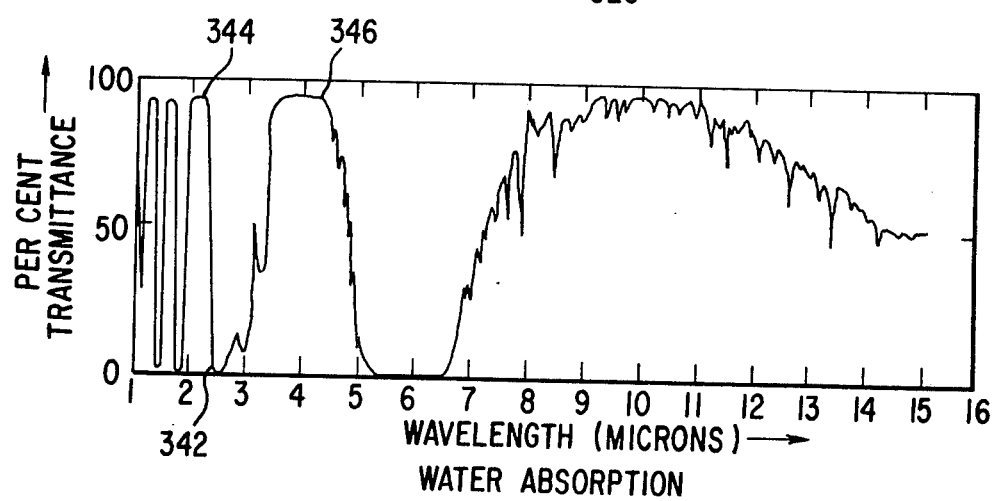
Figure 11:
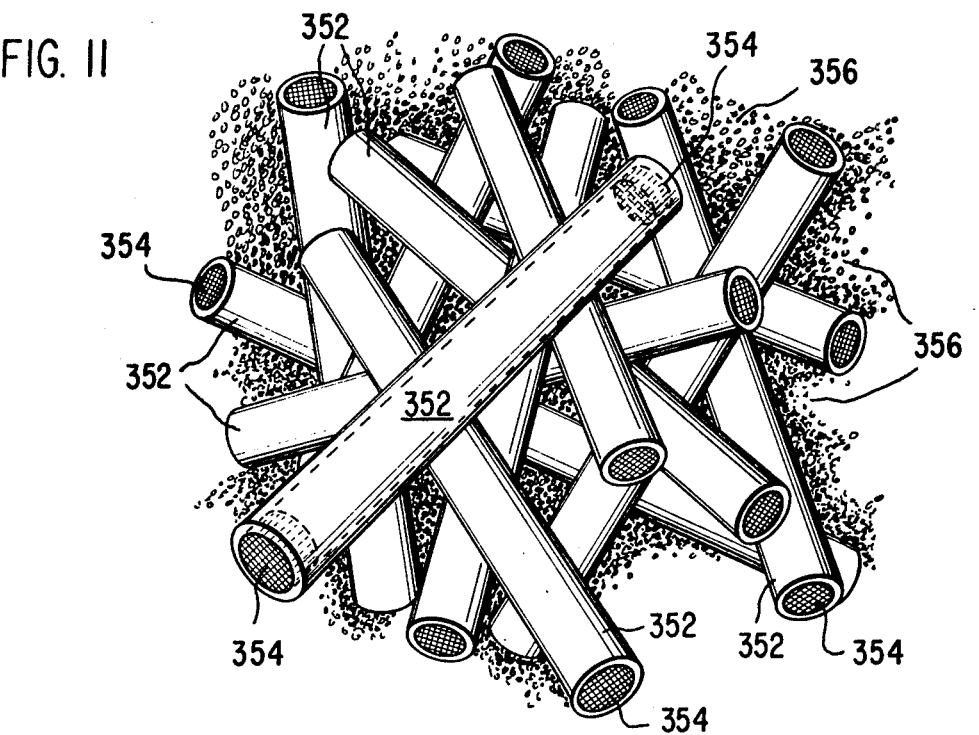
Figure 12:
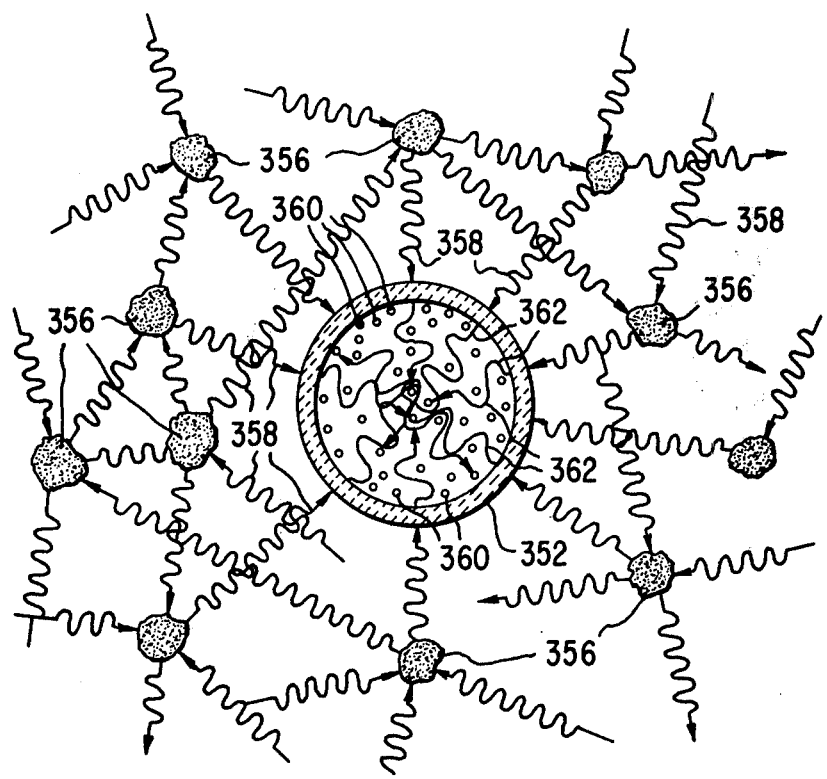
Figure 13:
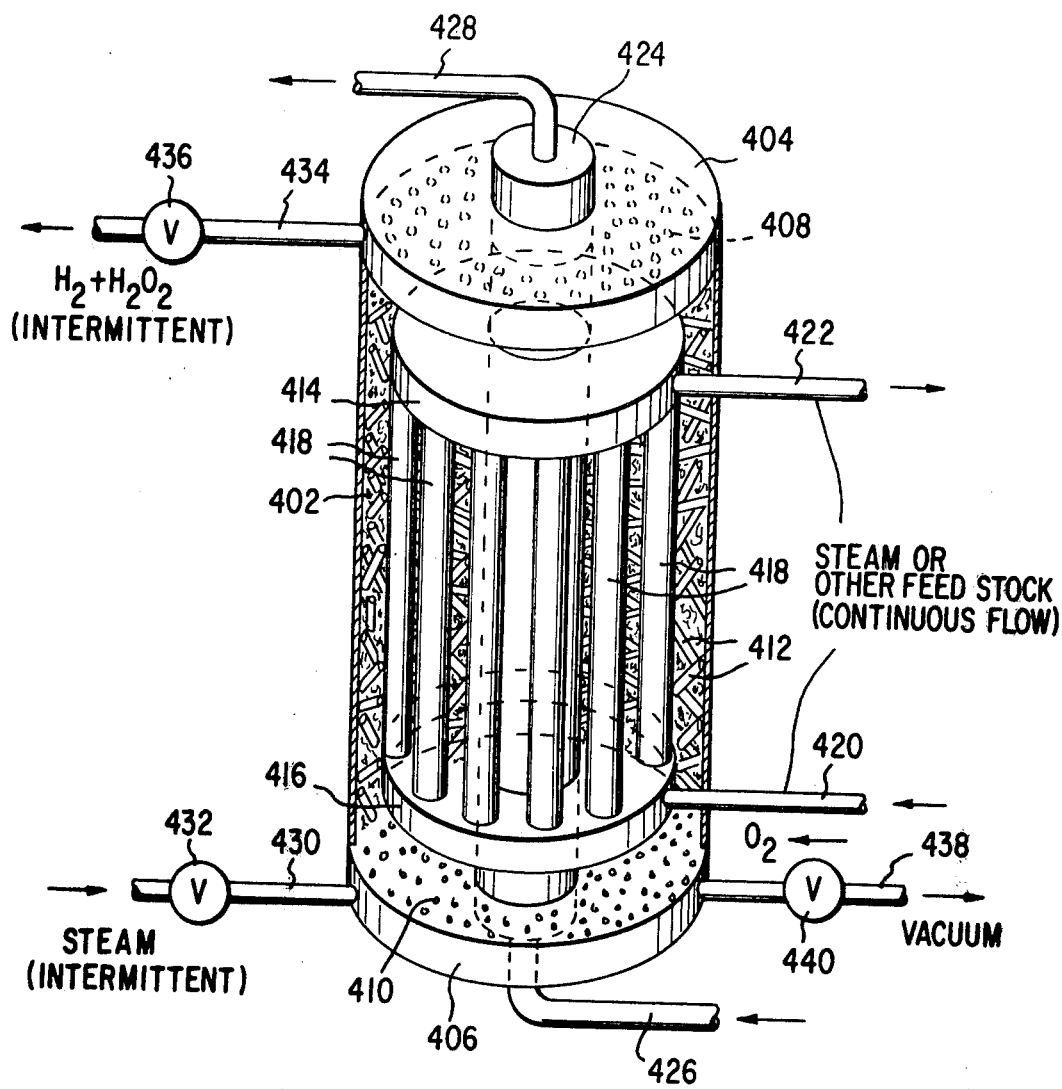

FIGL 7 is a pressure versus time plot for a multiple reaction chamber system of the present invention;

FIG. 8 is a cross-sectional view of a portion of a reaction chamber assembly which may be employed;

FIG. 9 is a schematic diagram of the structural relationship of a plurality of reaction chambers, central burner, and enclosing insulating housing of a preferred structural arrangement for use in a system of the present invention;

FIG. 10 is a plot of the absorption characteristics of water vapor versus wave length;

FIG. 11 is a showing of the contents of each of the reaction chambers employed in the preferred embodiment of the invention; FIG. 12 is a schematic diagram indicating the generation of concentrated radiation and its application to a feedstock, in accordance with the present invention;

FIG. 13 shows an alternative apparatus involving the continuous flow of feedstock.

Figure 14:
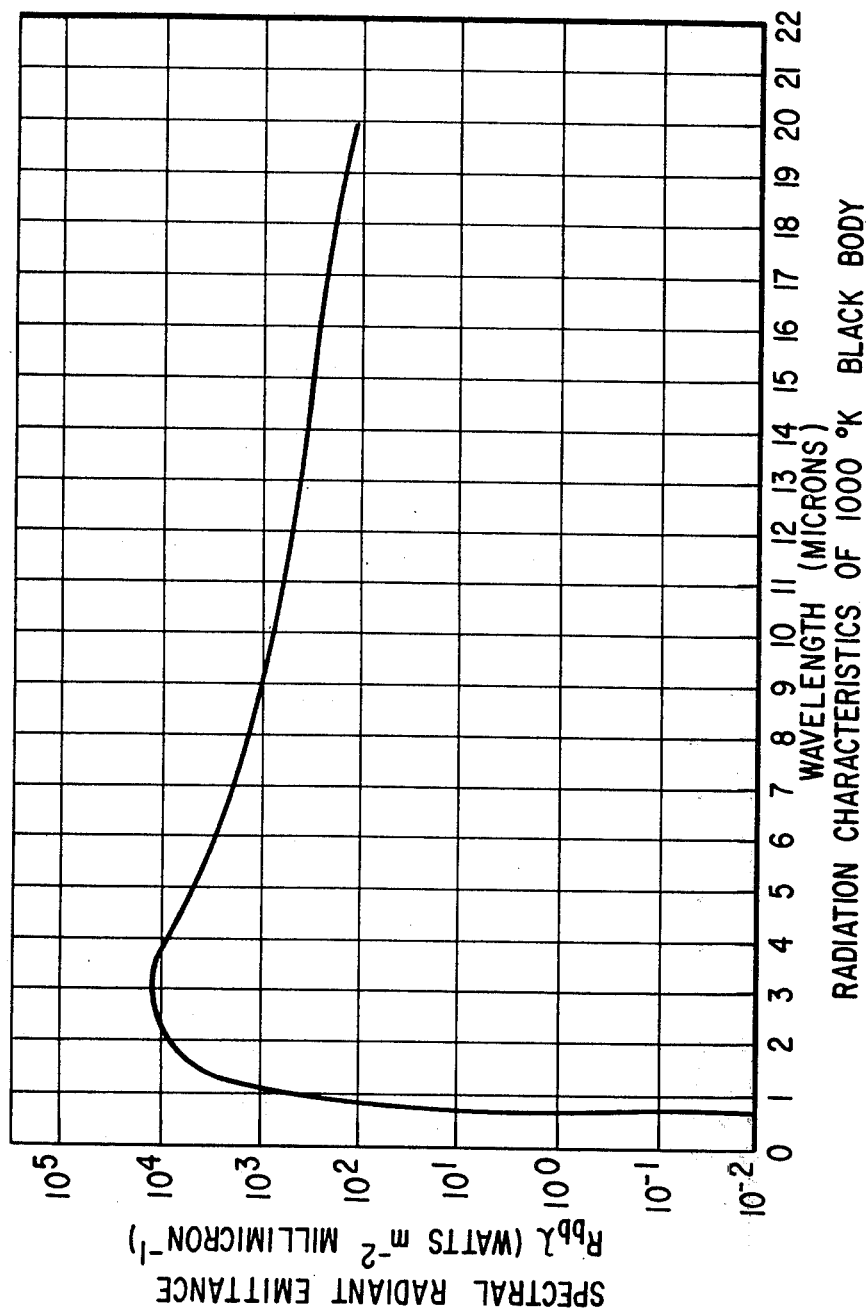
Figure 15:
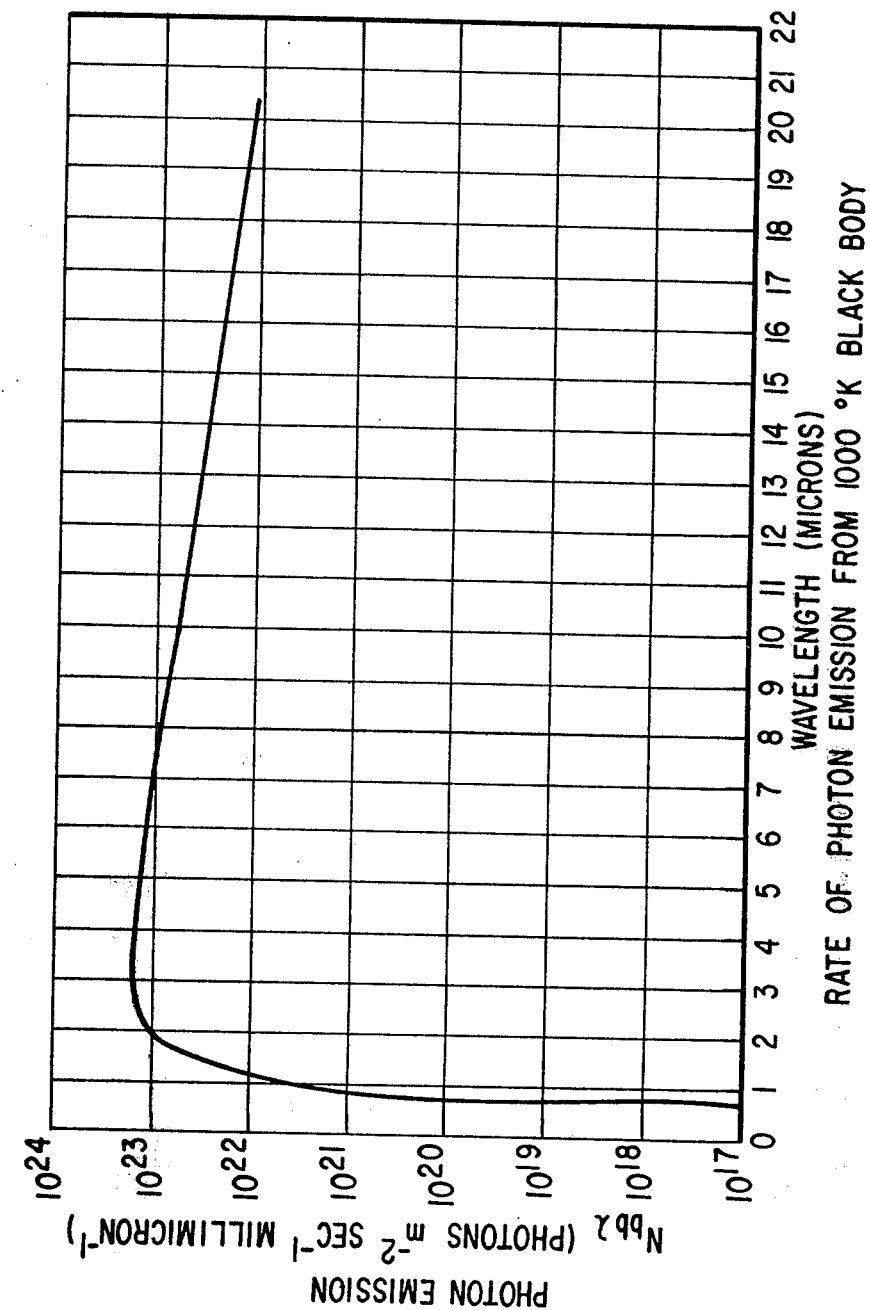
Figure 18:
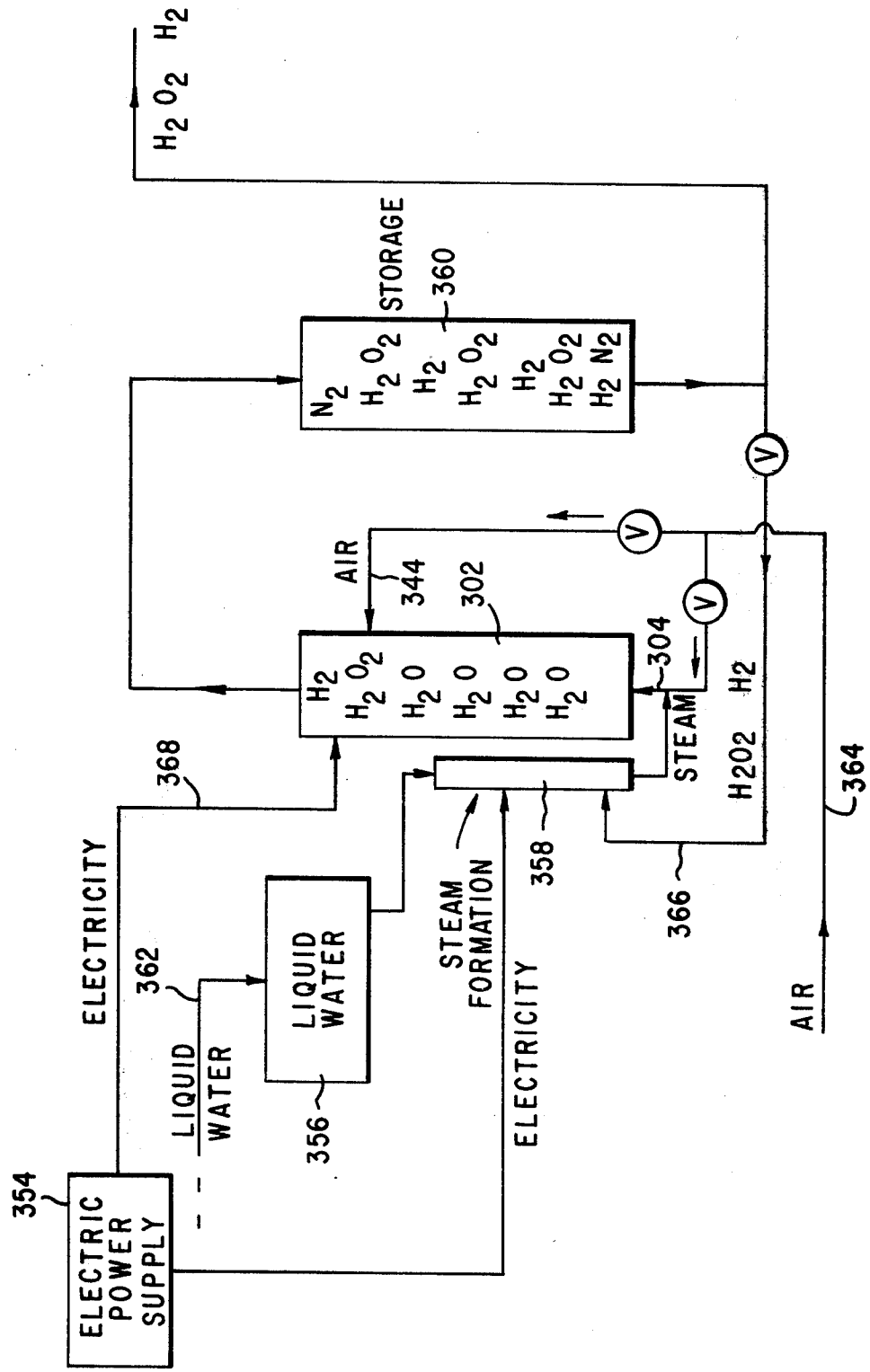
Figure 19:
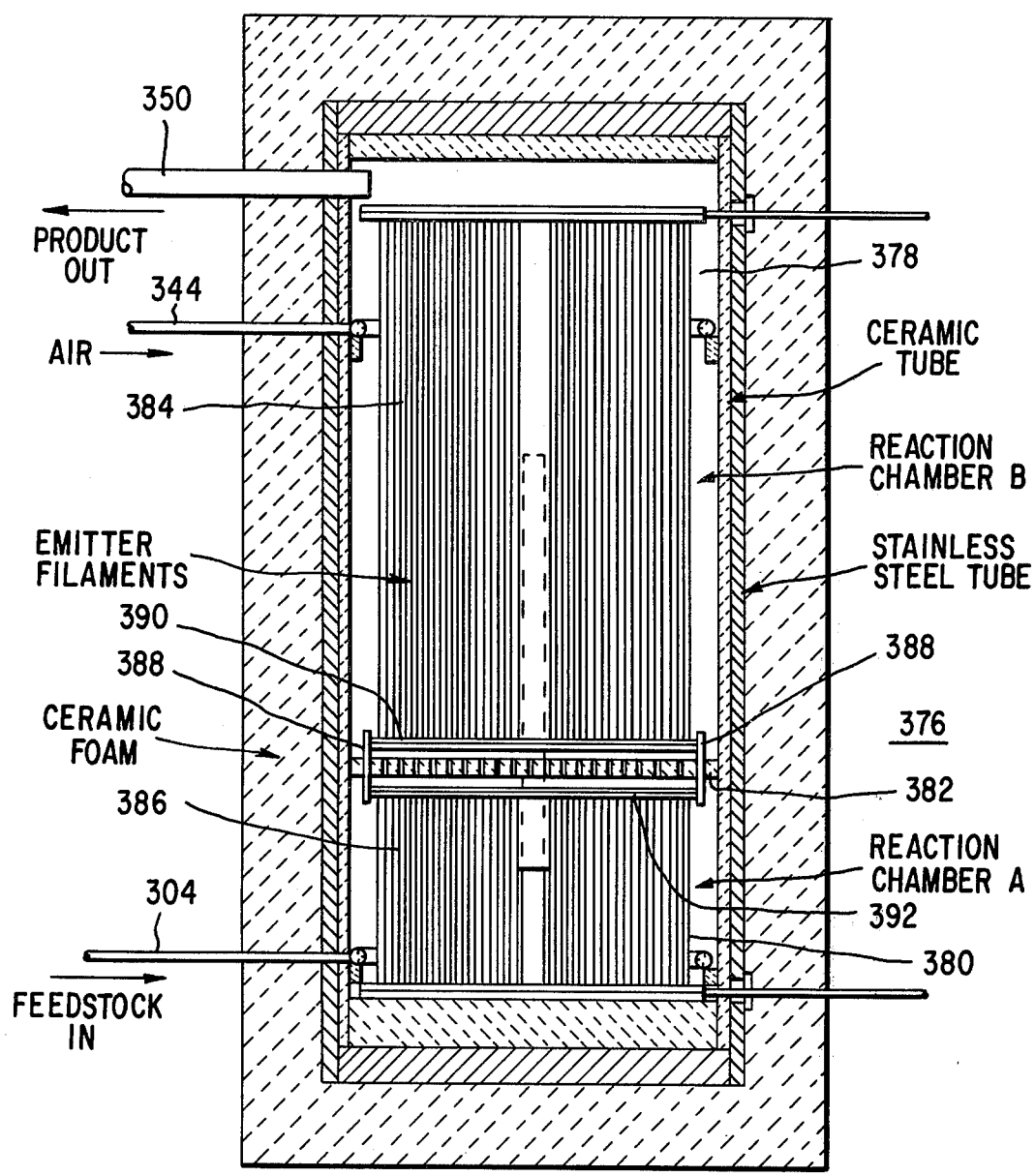
Figure 20:
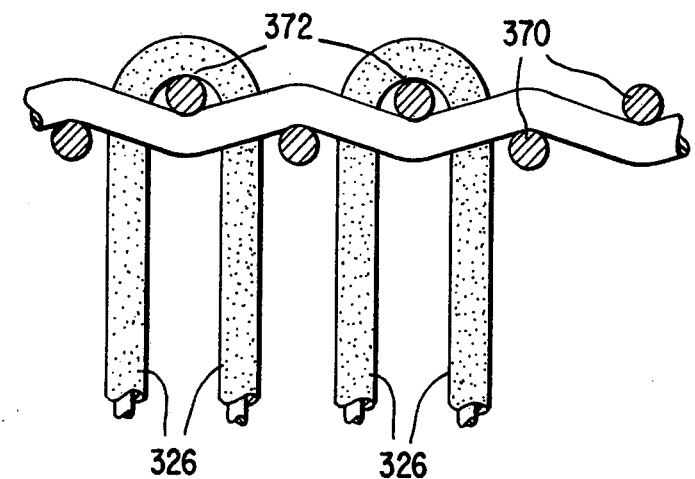
Figure 21:
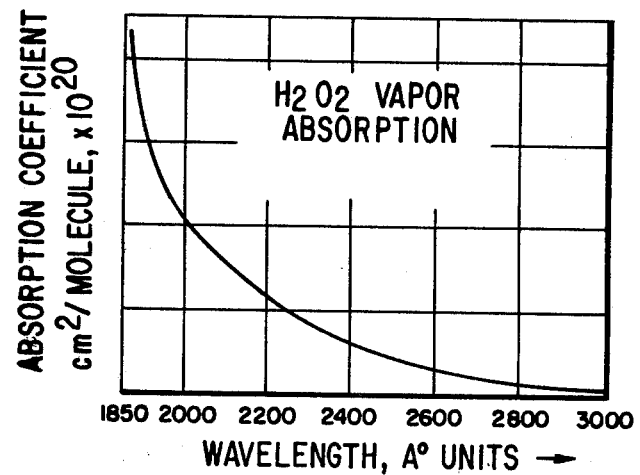
Figure 22:
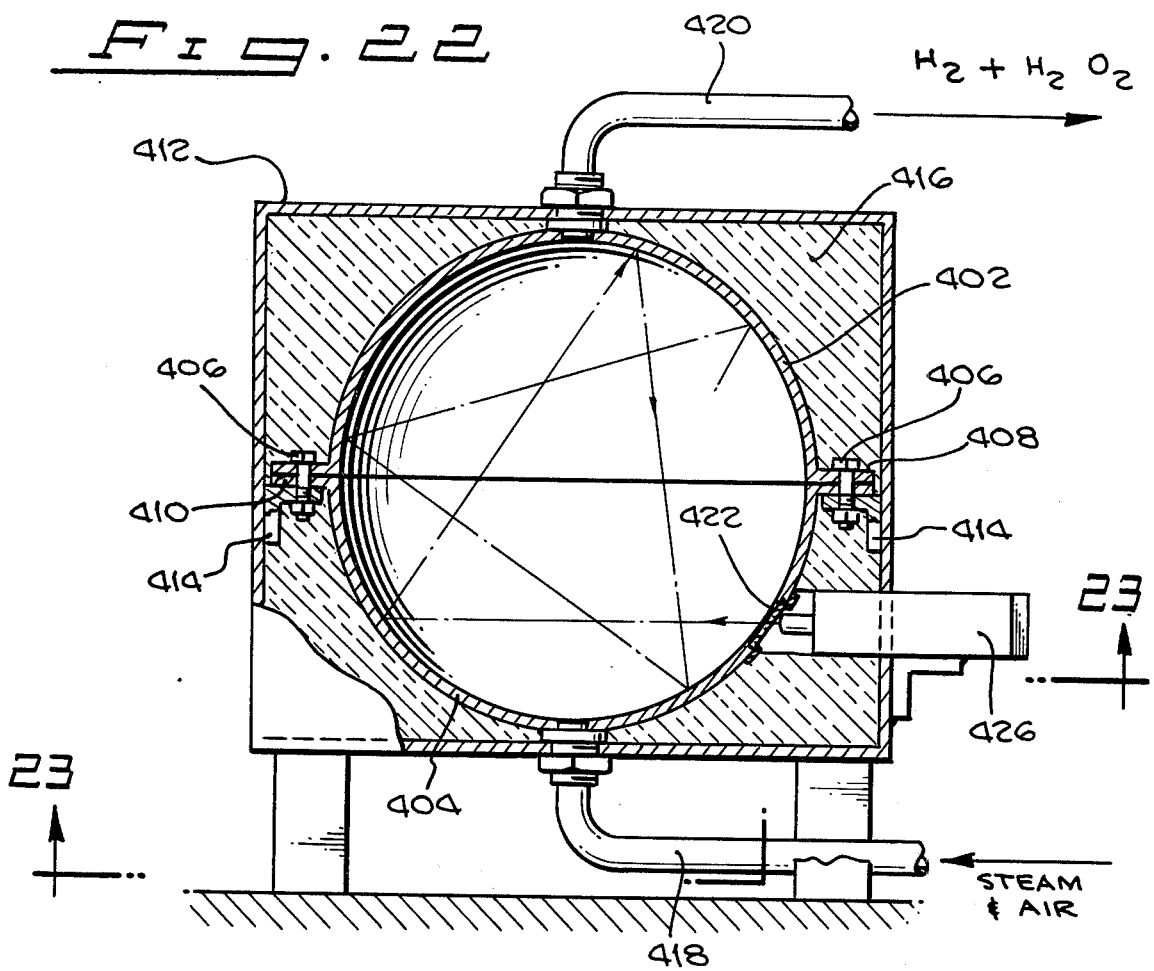
Figure 23:
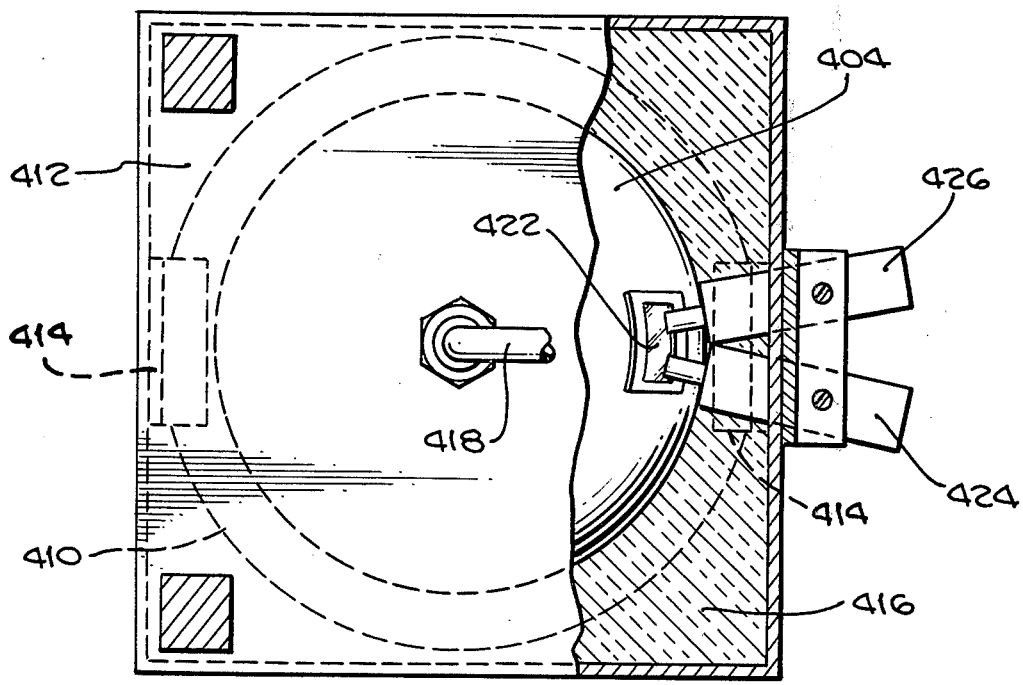

FIG. 14 is a plot of Photon Emission from a "Black Body" at 1000° K. versus Wavelength;

FIG. 15 is a plot of Radiant Emittance vs. Wavelength for a 1000° K. black body;

FIG. 16 shows a wire coated with radiation producing materials;

FIGS. 17 and 19 show reaction chambers for applying high frequency radiant energy to feedstocks;

FIG. 18 is a diagram showing the reaction chambers of FIGS. 17 and 19 included in an operative system;

FIG. 20 is a detailed showing of one arrangement for supporting the radiating wires of FIGS. 16, 17 and 19;

FIG. 21 shows the ultraviolet absorption characteristic of hydrogen peroxide, $H_2O_2$; and FIGS. 22 and 23 are side and sectional views, respectively, of a reaction chamber which is irradiated by light from two lasers of different frequencies.

Initially, before considering the drawings in detail, the relationship between the subject matter of the present case and that set forth in my prior copending case, U.S. patent application Ser. No. 768,868, filed Feb. 15, 1977, should be noted in greater detail. Specifically, the main difference between the apparatus of the present invention and that of the prior case is that the special sensitizers and host materials are added in the reaction chambers so as to be directly exposed to the water vapor. Additional oxygen may be supplied to the reaction chamber to facilitate formation of $H_2O_2$ in the reaction chamber, and the withdrawal of the $H_2O_2$ with $H_2$ from the reaction chamber.

The following description of FIGS. 1 through 8 of the drawings will closely parallel that set forth in my prior copending U.S. patent application Ser. No. 767,868. The portion of the detailed specification which is more closely related to the new host material and sensitizer material subject matter, and to the matching of the reaction characteristics to the absorption versus frequency characteristic of the feedstock will be found in that portion of the specification involving the description of FIGS. 9 through 13, and particularly FIGS. 10 through 13 in the following description.

DETAILED DESCRIPTION

Figure 1:
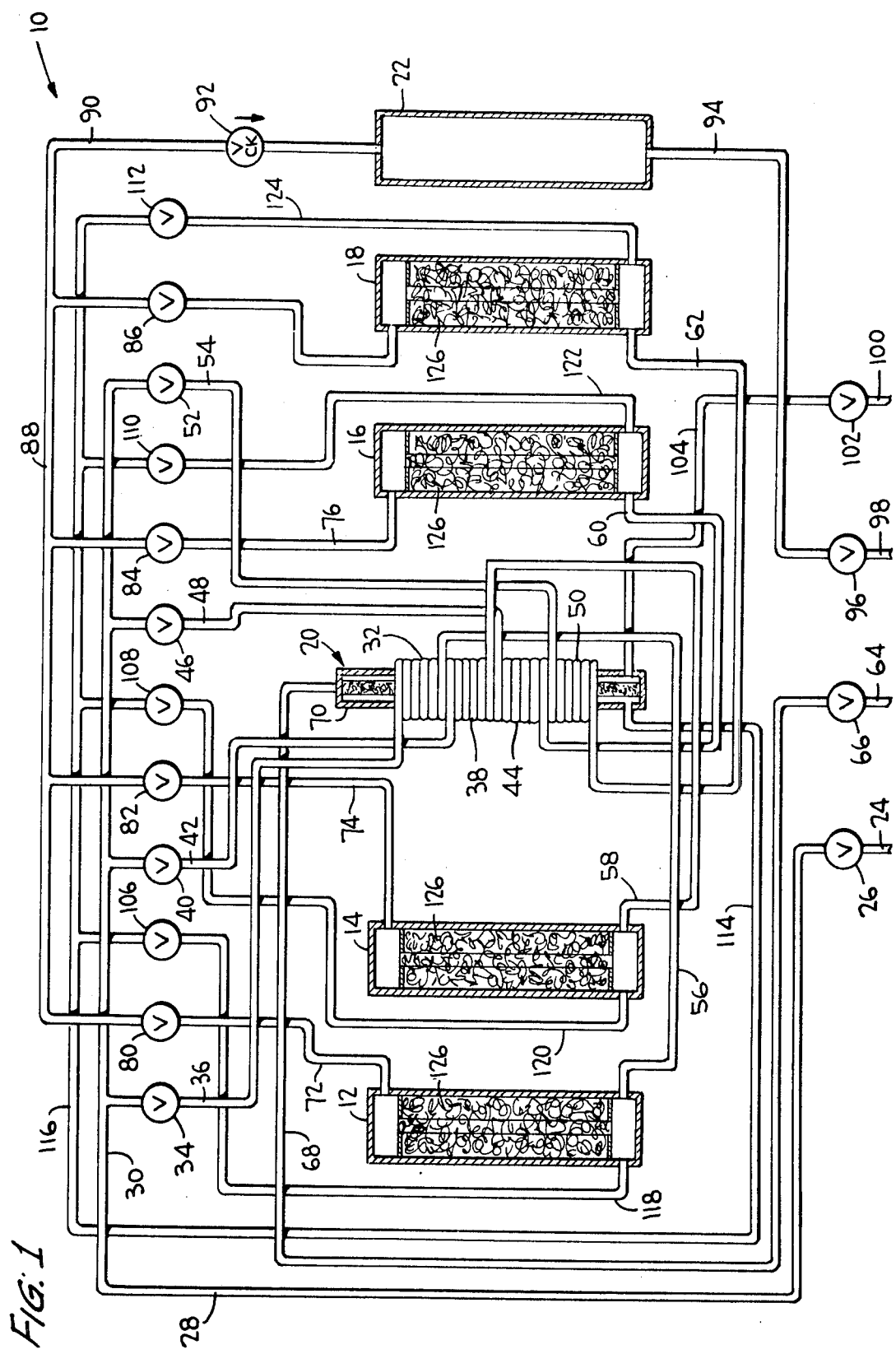
FIG. 1 is a schematic representation of an illustrative embodiment of the system of the present invention.

Turning now to FIG. 1, the system of the present invention is generally designated by the numeral 10 and it comprises reaction chambers 12, 14, 16 and 18, heating means generally designated 20, and a hydrogen and hydrogen peroxide reservoir or accumulator 22. Water enters the system at conduit 24, passes through flow control valve 26 and conduit 28 to manifold 30. Water may then be supplied to heat exchange coil 32 through valve 34 and conduit 36, to heat exchange coil 38 through valve 40 and conduit 42, to heat exchange coil 44 through valve 46 and conduit 48, and to heat exchange coil 50 through valve 52 and conduit 54. It will be seen that conduit 36 is the inlet end of heat exchange coil 32, the outlet of heat exchange coil 32 being conduit 56 which is connected to one end of reaction chamber 12. Similarly, the outlet end of heat exchange coil 38 is conduit 58 connected to one end of reaction chamber 14, the outlet end of heat exchange coil 44 is connected to one end of reaction chamber 16 through conduit 60, and the outlet end of heat exchange coil 50 is connected to one end of reaction chamber 18 through conduit 62.

Vacuum is applied to the system, for purposes which will become apparent as the description proceeds, through conduit 64, flow control valve 66, and conduit 68 which is connected to one end of a conventional gas burner 70. It will be appreciated that heating means 20 comprises burner 70 and heat exchange coils 32, 38, 44, and 50, and their respective conduits and valves.

As will also become apparent as the description proceeds, hydrogen and hydrogen peroxide generated in the reaction chambers 12, 14, 16, and 18 passes through conduits 72, 74, 76 and 78, respectively and valves 80, 82, 84 and 86, respectively, to manifold 88. The hydrogen and/or hydrogen peroxide then passes through conduit 90 with check valve 92 to hydrogen accumulator 22 where it is then drawn off for use through conduit 94, flow control valve 96, and conduit 98. Conduit 100, flow control valve 102 and conduit 104 are provided to allow atmospheric air to enter the system when and if needed, as will be described more fully hereinbelow.

Before proceeding further with a description of the system, it should be distinctly understood that while the example given herein for purely illustrative purposes includes four reaction chambers, there is, in fact, no limit other than practical considerations of size and weight as to the number of reaction chambers used. In fact, the invention could be practiced with as few as one reaction chamber and as many reaction chambers as desired, there being no reason why a bank of dozens or even a hundred reaction chambers could not be used. For this reason, applicant is not limiting himself to the use of four reaction chambers except for illustrative purposes. Obviously, one skilled in the art would easily be able to include the necessary valve elements and other hardware if he were adding more reaction chambers.

With the foregoing understood, the description of the instant inventive system will proceed. The system runs at about 900° K. or 1000° K. and may be pre-heated by any well-known electrical heating means such as that described in the parent application. Alternatively, pre-heating can be accomplished by burning hydrogen in burner 70, the hydrogen being the "tailings" left in one or more of the reaction chambers from a previous run of the system. For this pre-heating cycle, flow control valve 26 is opened to allow water to enter the system filling manifold 30. Valves 34, 40, 46 and 52 remain closed during this cycle. Valves 106, 108, 110 and 112 are opened. Vacuum is applied at conduit 64 with valve 66 opened. Thus, it will be seen that vacuum is applied via conduit 68 to burner 70. Since the other end of burner 70 is connected to conduit 114 which, in turn, is connected to manifold 116, manifold 116 is under vacuum. Then, since valves 106, 108, 110, and 112 are open, the vacuum is applied to reaction chambers 12, 14, 16 and 18, respectively, through conduits 118, 120, 122 and 124, respectively. Thus, any residual hydrogen tailings remaining in any of the reaction chambers is drawn into the inlet end of burner 70 to be burned along with any residual oxygen tailings or with atmospheric air drawn in through conduit 100 and valve 102 by the vacuum which also affects this air line. It should also be noted that in event of a "cold" start where there are no hydrogen tailings to be burned, a combustible gas, such as hydrogen, could be drawn in through conduit 100 and valve 102 to provide the initial start-up heat. The burning of hydrogen in burner 70 provides considerable heat which, by radiation and conduction is passed to the reaction chambers which are filled with reactant 126. When the system is pre-heated to a sufficiently high temperature, we are ready to proceed with the generation of hydrogen and hydrogen peroxide.

Valve 34 is opened to allow a predetermined amount of water to enter heat exchange coil 32 which is, in essence, a steam generator. The water is "flashed" to steam and delivered through conduit 56 to the inlet end of reaction chamber 12. The steam enters reaction chamber 12 containing reactant 126 to fill the total void volume and is constrained in this volume because all outlet valves are closed. The residence time, or reaction time, may be controlled from a few seconds (typically about 2 to about 3 seconds) to a rather long time (typically about 60 seconds), depending on the reactant used, the particulate size, the temperature, and the pressure. Valves 108, 110, and 112 are fully opened to allow the vacuum evacuation of all residual gases in the other reaction chambers and their respective heat exchangers and piping. It should be noted that since a predetermined amount of water was to be passed to heat exchange coil 32, valve 34 was opened for just a brief period and then closed.

Steam having entered and permeated reactant 126 in reaction chamber 12, valve 40 is then opened briefly to allow a metered amount of water into heat exchange coil 38, with the steam generated therein then passing through conduit 58 to reaction chamber 14. Valve 40 is then closed. The steam which passes into reaction chamber 14, as with the steam which had passed into reaction chamber 12, is converted into hydrogen and/or hydrogen peroxide and then held restrained in the reaction chamber for the predetermined control time. In the meantime, valve 80 is opened so that the pressure built up in reaction chamber 12 will force the hydrogen to exit through conduit 72 and valve 80 into manifold 88 and then through check valve 92 into the hydrogen accumulator 22. Valve 80 is then closed and valve 106 is opened to allow the vacuum to empty the residual hydrogen and oxygen tailings from reaction chamber 12 and pass it to burner 70 where the mixture is burned using disproportionated oxygen from reaction chambers 12, 16, and 18 along with additional atmospheric oxygen supplied through conduit 100, if necessary. It should be noted that when valve 80 was opened to pass the hydrogen and/or hydrogen peroxide out of chamber 12, and then vacuum was applied by opening valve 106, the oxidized reactant in chamber 12 disproportionated to release the bound oxygen since the temperature in the reaction chamber remained high and the pressure was lowered.

With valve 106 still open, valve 82 is also opened to allow the hydrogen and/or hydrogen peroxide generated in reaction chamber 14 to flow into the manifold 88 from which it is directed into the hydrogen reservoir 22. In the meantime, valve 46 had briefly opened to allow a metered amount of water into heat exchange coil 44 and then the steam formed in heat exchange coil 44 passes to the inlet end of reaction chamber 16. At this point, valve 84 is still closed. Valves 106 and 112 are still open to allow vacuum to exhaust chambers 12 and 18.

Valve 82 then closes and valve 108 opens along with valves 106 and 112 which are also open. Thus, hydrogen and/or hydrogen peroxide and oxygen tailings are being conveyed through valve 108 to burner 70 for combustion with the combustion gases being exhausted through conduit 68.

Then, valve 84 is opened to pass the hydrogen and/or hydrogen peroxide from reaction chamber 16 to manifold 88. Valves 106 and 108 are opened to allow vacuum to exhaust the respective chambers 12 and 14 while valve 52 has been allowed to briefly open to pass a metered amount of water to heat exchange coil 50 with the steam being formed then passing to reaction chamber 18. The steam in reaction chamber 18 reacts with reactant 126 to form hydrogen and/or hydrogen peroxide which is restrained since valve 86 is still closed. Valves 106, 108 and 110 are all open so that the other reaction chambers are being exhausted.

Valve 88 is then opened to relieve the pressure on reaction chamber 18 and allow the hydrogen and/or hydrogen peroxide to pass to manifold 88. At this point, the whole cycle starts again and valve 14 is briefly opened to allow a metered amount of water to pass to heat exchange coil 32, valve 86 is closed, and valve 112 is opened. The whole cycle then repeats.

While the system of the invention is shown schematically, it will be readily understood by one skilled in the art that it can be easily constructed. The valves are all of a mechanical type which are cam operated so that a precise timed sequence of events can be carried out in a predetermined manner, the timing of the opening and closing of the valves being controlled by the size, shape, configuration and speed at which the cams are moving.

The following "steps" are identifiable in the total reaction cycle involving gases and solids:

(1) Supply of the water vapor (steam) in the direction of flow.

(2) Diffusion of this steam into contact with the particulates of manganese oxides or to the reacting interface which may be on the surface, or inside the particulate, depending on the oxidation level of that particular particulate in the gradient (overall).

(3) Interface reaction (intrinsic rate), including sequestering of oxygen and the release of the gaseous product $H_2$.

(4) Diffusion of product from the interface.

(5) Removal of product, $H_2$, in the direction of flow.

(6) Concurrently with Steps 2-5, the water vapor is also being directly dissociated by photon action, producing both $H_2$ and $H_2O_2$, as described in detail below.

(7) Diffusion of combined oxygen from the interior of the reactant to the interface, and then away from the reactant in the direction of flow of the $H_2$ and $O_2$ residual tailings.

(8) Combustion of the $H_2$ and $O_2$ tailings in the centrally located burner.

(9) Removal of products of combustion from the burner in its separate direction of flow.

The instant process is a process in which a relatively small amount of heat-energy input, (in the form of preheat for the reactant) provides conditions for the reactant to effect changes of state, during which a gaseous chemical molecule is completely dissociated into its separate gaseous atoms by two distinct phenomena. In the course of one of these phenomena, the solid reactant concurrently effects a "change of state" by means of an exothermic transformation from one oxidation product level to another oxidation product level; and in the course of the second phenomena, to be described in detail below, the $H_2O$ molecules are directly dissociated by photon energy, forming $H_2$ and also $H_2O_2$, hydrogen peroxide.

It should also be noted that pressure changes play an important part in the system. Specifically, the reactant is heated to a temperature well above the dissociation temperature for oxygen from the metallic oxide of higher oxidation number at room tempeature. This temperature for $MnO_2$ is given in handbooks as 535° C., and at atmospheric pressure this $MnO_2$ will dissociate to $Mn_2O_3$ at temperatures above 535° C. Accordingly, it is desired to operate at temperatures well above 535° C. such as 600° C. to 950° C. In addition, during the hydrogen formation portion of the cycle, the pressure must be well above atmospheric so that the oxygen will be absorbed by the $Mn_2O_3$ (the oxide of lower oxidation number), with a pressure of about at least 75 psi or 100 being preferred, and preferably between 100 psi and 150 psi to as high as 200 psi or more. In addition, during the oxygen disproportionation phase, the free oxygen and other gases are removed from the vicinity of the reactant, preferably by a reduction in pressure to less than atmospheric, with about one-tenth atmosphere being successfully employed. As can be appreciated, by using temperatures and pressures well above and below critical levels during the two phases of the cycle, increased speeds of operation may be obtained.

Reference is now made to FIGS. 2 and 3 wherein the heating means 20 is shown in more detail. Heating means 20, as already discussed, comprises burner 70 and heat exchange coils 32, 38, 44, and 50. Burner 70 comprises casing 128 made of any suitable metallic material lined with a porous fire brick insulation 130 which is carved or otherwise formed to fit casing 128 and has an axial hollow core running longitudinally through most of its length. The hollow core is, in turn, filled with a suitable surface catalyst 132 for "burning" hydrogen and oxygen to form steam. Through the center of heating means 30 is a conventional electrical resistance heating element 140 which is used, when necessary, for pre-heating the system for a cold start. At the lower end of heating means 20 as in the drawings, are atmospheric air inlet 104 and residual tailings inlet 114. At the upper end is exhaust line 68.

The next sub-system under consideration is the reaction chambers 12, 14, 16 and 18. For an understanding of the construction of the reaction chambers, attention is directed to FIG. 4 where a single reaction chamber designated generally as 142 is shown. Reaction chamber 142 comprises an outer casing 144 made of any suitable material such as ⅜inch thick stainless steel or as discussed in the aforementioned co-pending application. It is filled with reactant 126 as discussed above and as shown and described below in connection with FIGS. 8, 11 and 12. Passing axially through the reactant is a conventional electrical resistance heating element 146, this heater being essentially the same as heater 140 in FIG. 22. This may be used for pre-heat in a cold start. As already discussed, however, the exact means used for pre-heating the system is not critical to the invention and any means well-known in the art for accomplishing this end may be used. The reactant 126, including sensitizer and host materials, is placed in casing 144 leaving a space at each end, these spaces being designated in FIG. 23 as 148 and 150. Spaces 148 and 150 essentially serve the function of surge tanks, manifolds, or the like. Steam inlet 152 and vacuum inlet 154 are provided at one end of reaction chamber 142 and hydrogen outlet 156 is provided at the other end. Steam inlet 152 corresponds to conduit 56, for instance, vacuum outlet 154 corresponds to conduit 118, for instance, and hydrogen outlet 156 corresponds to conduit 72, for instance, in FIG. 1.

Turning now to FIG. 5, the preferred configuration of the apparatus is shown along with the sub-system which includes the valves and driving mechanism for the same as well as the "plumbing". It will be seen that the valves which are described above are arrayed in a single line. The valves are of a conventional type which are operated by pushing or releasing a plunger designated, for convenience of illustration, as 158 in conjunction with valve 34. It will be appreciated that while the description of the valves refers to valve 34 and plunger 158 for exemplary purposes, each of the valves operates in the same manner. A variable speed motor 160 turns a drive shaft 162 which is journaled in mounting plates 164 and 166. Fixedly mounted on drive shaft 162 are cams 168, with one cam corresponding to each of the valves and mounted on drive shaft 162 in such a way as to cooperate with plunger 158 of each valve. Thus, as motor 160 turns drive shaft 162 and, in turn, cams 168, the valves are opened and closed in a manner which is predetermined by the positioning of cams 168. This, of course, will be readily understood by one skilled in the art.

Referring further to FIG. 5, it will be seen that the reaction chambers are set vertically in an enclosure that is square in cross-section and are shown in the drawing with reaction chamber 12 in the front left-hand corner, reaction chamber 14 in the rear left-hand corner, reaction chamber 16 in the front right-hand corner, and reaction chamber 18 in the rear right-hand corner. Heating means 20 is disposed in the center. The enclosure or, more specifically, inner enclosure 170 is preferably made of magnesium oxide packed in a stainless steel container. This material was chosen because it distributes heat evenly throughout the volume of the enclosure 170. Surrounding inner enclosure 170 is outer enclosure 172 which is made of any suitable material such as stainless steel and filled with a high quality insulation such as alumina fibers. It will be appreciated by one skilled in the art that any high quality, high temperature, insulating material may be used.

Returning to a consideration of the drawings, FIG. 6 is a block schematic drawing showing in a central position the reaction chamber or chambers 202 and an immediately associated steam generator 204. A reservoir of water 206 supplies water to the steam generator 204, which may be of any of the types described in connection with earlier figures of the drawings. In this connection, it may be noted that all of the arrangements shown in FIG. 6 are applicable to the hydrogen generation apparatus shown hereinabove in the present specification.

Steam or water vapor is supplied to the reaction chamber or chambers 202 through line 208 which may of course be internally connected between the immediately adjacent and thermally connected units 202 and 204. Hydrogen from reaction chamber or chambers 202 may be routed through output line 210 to the venturi tube combining unit 212 which is also in intimate heat-conducting relationship with reaction chamber 202 and the steam generator 204. As mentioned above, in connection with manganese oxide the temperature of the entire assembly, including the venturi unit 212, may be in the order of 600° to 950° C.

Hydrogen peroxide may be formed in either of two ways, and the proportion of hydrogen peroxide to hydrogen gas may be controlled by valves 213 and 215. Initially, considering the formation of $H_2O_2$ within the reactor chambers, by photon action, valving 215 would be opened while steam is present in the reaction chambers and while the $H_2$ gas is being drawn off, and oxygen at high pressure, corresponding to the pressure of the reaction chamber is admitted to chambers 202 via conduit 217 from pump 219.

Now considering the subsequent formation of $H_2O_2$, valve 215 would be permanently closed, and valve 213 would be open. When hydrogen starts to flow rapidly through the venturi unit 212 the check valve 214 will open and oxygen will be combined with hydrogen to form hydrogen peroxide. This combination of hydrogen with oxygen is an exothermic reaction as set forth quantitatively in equation form hereinbelow. The hydrogen and hydrogen peroxide is stored in reservoir 216, which is maintained at a relatively high pressure level by the check valve 218 which prevents loss of hydrogen back toward the reaction chamber 202 between the intermittent withdrawing of hydrogen from the reaction chamber 202. Hydrogen and hydrogen peroxide may be withdrawn as needed from the resorvoir 216 through an output line 220. By closing both valve 213 and valving 215, the amount of hydrogen peroxide which is generated is severely limited, and the bulk of the output will be hydrogen, rather than $H_2O_2$.

Vacuum pump 221 may be employed to speed up separation of oxygen, hydrogen tailings, and other residual gases from the reactant during dissociation or disproportionation.

with regard to the block diagram of FIG. 6, it is to be understood that the components shown in this figure may be employed in connection with any system described hereinabove in the present specification. Specifically, the various input and output control valves have been, for the most part, omitted from FIG. 25 for purposes of simplicity. Similarly, the precise physical arrangement, with the units 202, 204 and 212, for example, being in intimate heat-conducting relationship with each other, and insulated from the atmosphere, is not shown in FIG. 25, but may be in accordance with disclosures of other units disclosed in the present specification.

FIG. 7 shows a typical pressure versus time cycle for a system in accordance with the present invention using manganese oxide as the reactant, and four reaction chambers. This is, for example, of the type described hereinabove in connection with FIGS. 1 through 5 of the drawings.

The pressure is "gauge" pressure in pounds per square inch (psi). With this pressure scale, atmospheric pressure is of course indicated by zero.

Considering the cycles shown in FIG. 26 from an overall standpoint, the complete cycle for each reaction chamber including both breaking up the water vapor and dissociating the oxygen from the reactant may be 40 seconds. However, the cycles of the reaction chambers are evenly staggered in operation, by 10 seconds in the example so that hydrogen is generated on a substantially continuous basis. In FIG. 26 the pressure cycle for reaction chamber No. 1 is shown in the lower characteristic, and the pressure cycle for reaction chamber No. 2 is shown in the upper characteristic. The pressure versus time characteristics for reaction chambers Nos. 3 and 4 are substantially the same as those of chambers Nos. 1 and 2, but are displaced by additional 10 second intervals.

Now, referring specifically to the lower characteristic 230 in FIG. 7, the cycle starts with the opening of the water inlet valve for a couple of seconds at the beginning of the cycle. Steam is promptly generated and fills the first reaction chamber. At about 6 seconds, the hydrogen outlet output valve is opened as indicated by arrow 232. Hydrogen and/or $H_2O_2$ continues to flow until about 16 or 17 seconds of the cycle, when the hydrogen pressure drops to the hydrogen reservoir pressure, indicated as equal to 80 pounds by the dash dot line 234 in FIG. 26. The closure of the hydrogen reservoir check valve 218, as shown in FIG. 25, is indicated by the arrow 236 in FIG. 7. Soon after the closure of check valve 236 the pressure release and vacuum pump valve is opened, as indicated by arrow 238 and the pressure drops along characteristic 240 to the negative pressure of about one-tenth of an atmosphere indicated by line 242. During the interval from about 20 seconds to 40 seconds the disproportionation phase takes place. Then at approximately 40 seconds the water inlet valve is opened again, and the cycle repeats.

The upper characteristic in FIG. 7 shows the same cycle for reaction chamber No. 2 as described above for reaction chamber No. 1. In the upper characteristic the same reference numerals are employed, but primes are employed in place of the unprimed numbers used in connection with the lower plot of FIG. 7.

FIG. 8 is a fragmentary view of a portion of a reaction chamber such as that shown in FIGS. 1 and 4 described hereinabove. In FIG. 8 the outer cylindrical wall 252 may for example be made of one-quarter or three-eighths inch stainless steel.

Referring more specifically to FIG. 8, in order to expose the manganese oxide powder fully to the space within reaction chamber 258, this chamber is filled with a large number of hollow stainless steel screen elements which may be formed by taking small strips of stainless steel and folding them over upon themselves and welding or otherwise securing them together to form a hollow enclosed space. The chamber 258 is initially filled with these stainless steel, hollow mesh cells 260. Then a large quantity of manganese oxide is poured into the reaction chambers and is shaken down in among the stainless steel mesh cells to completely fill the entire chamber 258. In FIG. 8 a number of these stainless steel mesh cells designated 560 are shown, and the manganese oxide powder 262 between the cells is also indicated. It is to be understood, of course, that other techniques may be employed for exposing the reactant to the space within the reaction chamber, but the foregoing system has proved eminently satisfactory in at least one 4-reaction chamber apparatus which has been successfully operated.

In addition, the host and sensitizer material may be included in the fabrication of the wire mesh cells 260. With water vapor within these wire mesh cells, this feedstock is fully exposed to the intense radiation from the sensitizer.

FIG. 9 shows an improved structural arrangement of the reaction chambers in which the four reaction chambers 302, 304, 306 and 308 are donut-shaped and are stacked up on top of one another in intimate heat conducting and transferring relationship. Each of the four reaction chambers is provided with two manifolds 310 and 312 to supply gases to the reaction chambers and to remove gases therefrom. These input and output manifolds serve the same functions as the spaces 148 and 150 at the top and bottom of the cylindrical reaction chambers as shown in FIG. 4, for example.

Each of the reaction chambers 302, 304, 306, and 308 contain reactant, such as manganese oxide, and voids created by wire mesh cells as described above, or other structure which will be described below, with which the sensitizer and host materials are associated.

A burner 314 extends through the central opening of all of the four donut-shaped reaction chambers. The burner 314 has the general configuration shown in FIG. 3, but is provided with upper and lower apertured plates 316 and 318 for ease in applying the hydrogen and oxygen to the burner and for ease of withdrawing the burned gaseous products from the unit. Although the details of the burner 314 are not shown, it includes the refractory lining and the granular refractory material such as is shown at 130 and 132, respectively, in FIG. 3.

The unit of FIG. 9 is also provided with heavy upper and lower plates 320 and 322, which are bolted together with a series of bolts 324 spaced around the periphery of the plates 320 and 322. With this arrangement the reaction chambers 302, 304, 306, and 308 are rigidly held together in intimate heat conducting relationship, and can withstand very high pressures even at very high temperatures with deformation of the reaction chambers.

The reaction chamber assembly is mounted on any suitable insulating support as indicated by the blocks 326. A lower metal base 328 and lighter gauge stainless steel metal sidewalls 330 are also provided. High temperature heat insulating ceramic wool encloses the reaction chamber assembly and reduces heat radiation to very low levels. The ceramic wool is indicated by reference numeral 332 in FIG. 9. In passing, it may be noted that the use of flat donut-shaped reaction chambers provides a geometry which is superior to the set of five cylinders shown in FIG. 5, in that the reaction chambers are in more intimate heat conducting association with one another and with the central burner, than in the arrangement of FIG. 5.

Apart from the physical arrangement of the four reaction chambers and the central burner, the "plumbing" and mode of operation of the system as described in connection with FIGS. 1 through 8, remains unchanged.

A more detailed consideration of the absorption characteristic of water vapor and other possible feedstocks, and the matching of the host and sensitizer materials to the feedstock absorption characteristic will now be undertaken.

In FIG. 10 the relative transmittance and absorption of water vapor at different wavelengths is shown. By way of example, note that at wavelengths of about 2.5 to 2.6 microns, the curve which represents transmittance has a dip designated 342 in FIG. 10. This is in contrast to the peaks 344 and 346 which are centered just above 2 microns, and in the vicinity of 4 microns, respectively. A combined host material and sensitizer which will provide intense coherent radiation in the vicinity of 2.5 and 2.6 microns, and which absorbs energy in the vicinity of 1.2 to 1.3 microns, will be employed as one set of materials for concentrating energy and applying it to water vapor. The particular host material and sensitizer which provides this wavelength of absorbing heat energy and radiating energy is calcium fluoride $CaF_2$ as the host material, and uranium-3 as the sensitizer.

Before considering FIGS. 11 and 12 some background relative to the phenomena which are taking place will now be included.

Initially, it may be noted that the theory of Masers and Lasers of course forms a background for the present invention. The word "LASER" is an acronym which stands for the Light Amplification by the Stimulated Emission of Radiation. Although related to some extent to Maser and Laser theory, the present invention does not involve the intense collimated beams of energy characteristic of Masers and Lasers; and of course, Masers and Lasers do not derive their energy from a heat reservoir made up of a body of material at elevated temperatures.

Types of Radiation

There are two separate processes by which a material can become a generator (or producer) or radiation energy after absorbing suitable quantities of primary energy. In the first process the absorbed energy is converted (degraded) into a low-quantum-energy heat that diffuses through the material which then emits radiation called thermal radiation.

In the second process an appreciable part of the absorbed energy is temporarily localized as relatively high-quantum-energy excitation of atoms or small groups of atoms which then emit radiation called luminescense radiation.

Specifically, "luminescense" is a process whereby matter generates nonthermal radiation which is characteristic of the materials involved and not the temperatures. Sometimes, however, the radiation as generated is also called "luminescence". It is in fact luminescense only when the radiated energy is in excess of the thermal radiation produced by heat.

Thermal radiation from solids is generally a broad continuous spectrum of radiation, especially infrared, which is emitted in increasing amount as the temperature of the solid is increased.

The quality and quantity of thermal radiation depend almost exclusively on the temperature rather than the nature of the emitting solid material. Broadly and objectively speaking, luminescence describes emission of radiation (of subatomic origin) in excess of thermal radiation; that is, luminescence yields photon emission in excess of the photon emission produced entirely by thermal agitation.

Luminescence is generally excited by primary photons or charged material particles having individual energies ranging from about 2 ev to over $10^6$ ev and affords emitted photons with energies in excess of 1 ev. When luminescence is excited by energy liberated during chemical reactions, the liberated energy per emitting atom or molecule usually exceeds 1 ev. These excitation energies are hundreds to millions of times greater than the energies of individual phonons in solids. A single phonon can increase the energy of an electron or atom in a solid by at most a few hundredths of an electron volt, whereas the individual primary particles normally used to excite luminescence can provide energy increases up to the total amount of energy carried by the primary particle (except for rest-mass energy), that is, tens to millions of electron volts.

In order to obtain barely visible emissions of thermal radiation from a solid, the temperature of the solid must be raised above 900° K. to obtain an appreciable probability of getting 1.7 ev (or greater) electronic excitations by the cumulative action of phonons.

The thermal radiations from real solids cannot exceed the emission which would be obtained from a perfect black body at the given temperature and frequency. Most solids emit somewhat less thermal radiation than the maximum which is expressed by:

$$P_\nu = 8 \pi h \nu^3 C^{-3} (E^{h\nu/kT} - 1)^{-1} \text{erg cm}^{-2} \text{sec}^{-1} \quad (50)$$

The peak wavelength $\lambda pk$ of the broad emission band of black body radiation is inversely proportional to T, according to WIEN'S displacement.

$$\lambda pk = 0.29 T^{-1} \text{cm} = 2.7 \times 10^7 T^{-1} \text{A} \quad (51)$$

The TOTAL THERMAL EMISSIVE POWER $P_T$ of a perfect black body increases as $T^4$, according to the STEFAN-BOLTZMANN LAW:

$$P_T = 2\,{}^5 k^4 T^4 / 15 C^2 h^3 = 5.7 \times 10^{-5} T^4 \text{ erg cm}^{-2} \text{sec}^{-1} \quad (52)$$

At room temperature (about 200° K.), $\lambda pk$ is in the far infrared at 97,000 A, and $P_T$ is only $4.6 \times 10^5$ erg cm$^{-2}$ sec$^{-1}$, so that there is not an appreciable amount of radiation in the VISIBLE region between 4000 and 7000 A.

At the temperature of an incandescent lamp filament (about 2800° K.), $\lambda pk$ is about 10,000 A, and $P_T$ is $3.5 \times 10^9$ erg cm$^{-2}$ sec$^{-1}$, so that there is an appreciable emission in the visible part of the spectrum. In the temperature range between about 700 and 1000° K. there is an overlapping of feeble luminiscence and feeble incandescence.

The present invention involves temperatures from a lower limit of about 900° to 1000° Kelvin or about 600° to 700° Centigrade and ranges upward from these temperatures with the upper limit controlled only by the strengths of the materials utilized (1) as the reactant or host/sensitizer, (2) for the reaction chamber, and (3) for the tanks, tubing, etc.

The Haser Concept

The Maser/Laser type of acronym may also be applied to another system termed "Haser", an acronym for "Heat Amplification by Stimulated Emission of Radiation." As will be developed below, however, the term "Amplification" is not used in the sense of increasing signal strength, but in the sense of amplifying the effectiveness of heat energy.

The Haser application depends not as much on coherence or monochromaticity per se, but rather on the unprecedented energy per unit area. This radiated energy is a by-product of the coherence of the radiation, and can be many orders of magnitude greater in energy than normal incoherent thermal radiation. To understand why this is possible, it is necessary to review briefly a few of the basic differences between the incoherent radiation produced by an ordinary bright source and the coherent light (radiation) produced by a laser or maser.

In a conventional source the atoms of a solid (or a gas) are agitated either thermally or electrically to higher energy states. When these atoms return spontaneously to their lower levels, they radiate some of their excess energy as light. Since each atom behaves independently at this state, its emission is at a random time and in a random direction with a random polarization.

It follows that the light radiated in a single direction is the complex sum of all the light from the individual atoms. The phases of any two atoms will tend to cancel their radiation in some directions and enhance it in others. The total energy of the source will be on the average be radiated uniformly in all accessible directions, and the amount of energy observed in a given direction will be proportional to the solid angle subtended by the observing device. In the Haser interior the observing device is either a water-vapor molecule (or other feedstock) or another particulate of reactant.

The maximum total energy that can be radiated by a given source depends on two factors: the surface area of the source and the maximum temperature to which the source has been heated. Therefore, in practice, the only way to increase the power output from an ordinary source beyond the limitations imposed by the source material is to increase the surface area of the source.

Power output, however, is only half the solution. Concentrated power is much more important than power itself. A 40-watt fluorescent lamp, for example, produces more light than a 40-watt incandescent lamp, but the fluorescent lamp is not nearly as effective as the incandescent light source for a spotlight.

Now, in a laser or maser, the energy is also emitted when atoms drop from a higher energy level to a lower one; however, in this case the atoms are triggered and emit radiation (to a large percentage) in unison. In the case of the Haser, the atoms are triggered to emit radiation in unison by phonon/photon waves within the unit cavity or cell interior. Enough of the energy previously generated is retained within the mass of particulates to maintain emission in a compatible phase, polarization and direction. This phonon wave interacts with the excited atoms and causes them (to a large degree) to emit their excess energy in phase with the stimulating wave before they have a chance to do it randomly.

As a result, the Haser generates a good percentage of its radiated energy so that it travels in synchronism with the standing phonon waves, therefore concentrating the energy emitted as photons.

In effect, the radiated photons from the Haser particulates are all relatively concentrated, monochromatic, and therefore, relatively coherent energy sources. This results in an excellent energy density even though the photons are traveling in practically an infinite number of directions, due to the fact that the particulate sources number in hundreds of millions. The photons moving from particulate to particulate impact and are absorbed by other particulates. Then, this STORAGE, BUILD-UP, AND RELEASE of the "phase and amplitude of radiated energy," combined with the fine particulate geometry of the Haser power (energy) source, which provides surface area to emit photons in extremes, allows a "maximum efficiency utilization" of the radiated energy within the Haser cavity.

The act of controlling the spectral emissions to most effectively dissociate (for example) water vapor, by sensitizing the host compound properly is another very important point. The monochromatic waves may become distorted in passing through substances, so that harmonic waves are generated at two or more times their original frequency.

Infrared wavelengths may be converted into visible light, and visible light into ultraviolet waves.

This new system utilizes fine (small) particulates of solids comprised of oxides which are predetermined by design within which some of the host atoms are replaced by other frequency sensitive atoms also predetermined by design, which, provide stimulated absorption and emission at predetermined wavelengths.

An ohmic (or other) pre-heat provides to the heat reservoir mass the original energy to liberate a massive volume of photons at the frequency range which will activate the sensitive atoms included in the host compound; the fine multi-faceted particulates absorb the photons which normally proceed as phonons through the particulate to generate and provide large numbers of cavity resonances which stimulates emission with each internal excursion; therefore, again, the gain by this regenerative amplifier when driven by the thermal noise fluctuations from the cavity walls, can be significant.

In the case of the HASER, the principle emissions of radiation designed and produced to dissociate the chemical product may be emitted from the woven wire mesh cavity balls or cells 260 (FIG. 8) that fill the entire Haser cavity.

The "preheat" energy can be electrical and inserted (through resistance heaters) into the internal cavity or the heaters may also be external to the cavity and heat the mass by conduction and radiation through solids.

Also, the "preheat" energy may be inserted by combusting suitable fuels such as hydrogen, hydrogen peroxide, alcohol, and other hydrocarbons, directly in the internal cavity of the unit or within a "center-core" burning unit as is designed into the unit of FIG. 9, for example.

As the reactive mass reaches temperature levels which excite the molecules and atoms to a radiating level of energy, phonons and photons evolve which distribute the thermal energy within the mass. Incidentally, relative to the use of the terms "photon" and "phonon", when a phonon traveling through space impinges on a solid, the resultant wave in the solid is termed a "phonon".

The ability of 'atoms' to store energy has to do with the electrons within the individual atoms. The electrons exist as a cloud of negative charge around the positively charged nucleus. Each election occupies a state of energy and angular momentum that cannot be occupied by any other election.

Therefore, the electrons tend to fill stable shells surrounding the nucleus.

The electrons of the outermost shell are the ones most easily affected by outside forces because of their accessibility. These outer electrons can be moved to higher energy states, but they always tend to return to their lowest energy state: the ground state. Electrons at certain levels decay (fall to a lower state) more easily than electrons at other levels.

Each excited electronic state of the atom has a characteristic lifetime that indicates the average time it takes an electron to fall to a lower level and therefore radiate a photon. Most excited states have lifetimes of about $10^{-8}$ second.

There are some excited states or levels in all atoms in which the electron cannot decay easily by giving up a photon. Such atoms must therefore wait for other means of giving up their energy, such as colliding with other atoms or with the walls of the system. Electrons in this state of energy tend to stay there for relatively long periods of time (0.001 second or more), and are referred to as being in metastable states. This is an important part of the storing of energy, which can then be retrieved in the excitation process by stimulation.

The normal radiative decay from a higher electronic state to a lower one is termed spontaneous emission. As discussed earlier, processes exist that can force an atomic electron to a higher state or stimulate it to jump to a lower state. An example of forcing, as discussed earlier, is provided when a photon collides with an atom and excites the outer electron to a higher level, which can happen when the energy or wavelength of the photon corresponds exactly to the difference in energy between the state the electron is in and some higher possible state. This process is known as absorption because the photon (energy) is actually absorbed by the atom and all the photon's energy goes into raising the electron to a higher state.

Similarly, as discussed earlier, the stimulated electron can move to a lower level, provided that such a level exists and that the difference between the two levels corresponds to the energy of the incoming photon exactly. The energy given up by the electron in jumping to a lower state goes into creating an additional photon with the same characteristics as the colliding photon.

A large number of atoms can provide an increase in the radiated energy at the desired frequency or energy level, if the population of electrons in the excited states of the atoms is suitably arranged. Consider two excited levels of a system of identical atoms with the electrons divided between the upper and lower levels. If a radiated photon having a wavelength corresponding to the difference in energy between the two levels is allowed to pass through the system medium, it will be amplified if there are more atoms with electrons in the upper state and absorbed if there are more atoms with electrons in the lower state. The condition of having more atoms in the upper state is called a "population inversion" (because it goes against the normal processes of nature, which tend to keep more electrons at lower energies than at higher energies).

The search for new Haser "systems" is therefore not easy, because one is working against the natural tendencies of the electrons.

Another important consideration is the actual 'lifetimes' of the ion energy levels of the impurity atoms involved in the population inversion. The upper level of a two-level system with a population inversion radiates energy corresponding exactly to the difference between the two levels.

The electrons that have thus yielded energy by radiation, end up at the lower level. If they remained there, the situation would result wherein there would be more atoms at the lower level than at the upper level, and as discussed earlier, there would be absorption instead of gain. For continuous operation, one must find impurity atoms with combinations of levels such that the lower level has a short lifetime and the upper level is preferentially populated. This necessity rules out the ion ground state as a possible Haser level, since all ion ground states are metastable. The pair (or more) or ion energy levels which will provide amplification must be energetically above the ground state but still below the metastable states.

Although the original gas laser utilized electrical excitation of electronic transitions, later versions use vibrational transistions in molecules such as carbon dioxide, and the excitation mechanism may involve electrical or chemical excitation, or the burning of fuel.

In the chemical laser, atomic species such as hydrogen and fluorine can be reacted to produce molecules in an excited vibrational state which in turn yields amplification or oscillation.

An entirely new excitation process was announced by Garry in 1970. In this, the gas dynamic laser, an appropriate fuel is burned to produce carbon dioxide and nitrogen at high temperature and pressure. When released through a nozzle into the optical resonator region, the gas cools rapidly in terms of its kinetic or translational energy, but the population of the vibrational energy levels of the carbon dioxide molecules becomes inverted since the lower level of the laser transition relaxes more rapidly. In addition, the vibrationally excited nitrogen molecules are in near resonance with the upper laser state of the carbon dioxide and transfer energy with high efficiency to maintain the inversion. This type of 'laser' has produced continuous powers as high as 60 kw.

The HASER phenomenon as utilized in the present invention, actually uses a thermochemical excitation mechanism. The original preheat energy prepares the reactant material within the reaction chamber by bringing the material to photon emitting temperatures.

When water vapor is introduced into the chambers of FIGS. 1 and 8, for example, the excited billions of photons emitted and traveling between particulates, strikes the sensitized "Cavities" with a barrage of photons designed to provide frequency, amplitude, and steric factor impact adequate to dissociate the $H_2O$ molecules. On dissociation, the $2H_2$, and $O_2$ molecules are vibrating at very high temperatures and pressures which are compatible with recombining these molecules through the "activated complex" mechanism into their (high temperature) preferential $H_2O_2 + H_2$ molecules, which incidentally evolves more than 33 KCal/mole heat energy. As the steam enters and traverses the cavity, an amount of the steam (depending upon the design of the contents of the reactor chamber and the relative amount of reactant, manganese oxide or other similar metal oxide, and the host/sensitizer material), combines with the reactant, which raises the oxidation level through the process of oxidation; and this of course, evolves heat energy (because this is an exothemic reaction), which, broadcasts more photons of energy throughout the cavity interior, to react with the sensitizers and activators; and this in turn creates massive amounts of new photons of energy to dissociate the $H_2O$ vapor and maintain the reaction temperatures within the host materials.

Haser Cavities

Referring again to FIG. 8, the cavities 260 can be fabricated of very fine mesh woven wire, which is cut into small sections, stamped, folded, and the outer edges of the wire mesh are secured together to form a hollow cell. The wire, of a diameter approximately equal to 0.002 inch, is made up of the elements, compounds, and a metal carrier (inert to the process), and is initially woven and formed into the cells as described above. It is then transformed into the desired host and sensitizer materials through oxidation in an atmospherically controlled furnace or kiln.

Ceramic Haser Tubes

Instead of the wire mesh cells 260 as shown in FIG. 8, the preferred form of Haser cavity is shown in FIG. 11 in which a large number of ceramic tubes 352 are present. These tubes are preferably extruded from mullite, which is a common clay having the approximate chemical structure of $2Al_2O_3 \cdot SiO_2$ with a range to $3Al_2O_3 \cdot 2SiO_2$. Suitable quantities of host and sensitizer materials, as described below, are added to, and thoroughly mixed with the mullite prior to extrusion. Subsequent to extrusion the tubes are fired in a suitable kiln or furnace. The tubes may suitably have a diameter of about ¼ inch or ½ inch and be from 1 to 12 inches in length. The sidewalls may suitably be from 1/32 to 1/16 of an inch in thickness, but none of the foregoing dimensions are critical. After firing, the tubes 352 are provided with filters 354 in both ends. The filters may be of any suitable structure, for example, several layers of metal gauze, to prevent the intrusion of the reactant 356 which may, for example, be manganese oxide. In practice the ceramic tubes 352 with their associated filters 354 may be initially placed in one of the reaction chambers such as reaction chamber 302, 304, 306, and 308 of FIG. 9, or the chambers 126 of FIG. 1; and then powdered metallic manganese or manganese oxide may be poured in and the entire unit vibrated until the manganese oxide 356 as shown in FIG. 11 fills all the space around the ceramic tubes 352. With this arrangement, of course, the water vapor is present within all of the ceramic tubes 352; heat is provided by the manganese oxide 356; and radiation from the host/sensitizer combination forming part of the ceramic walls 352 radiates intense coherent energy in one or more of the absorption bands of water vapor; and this intense radiation serves to dissociate the hydrogen and oxygen atoms making up the water vapor molecule.

The foregoing action is shown diagrammatically in FIG. 12 in which the tube 352 is shown centrally located and the surrounding particles of manganese oxide 356 are shown radiating broad spectrum thermal radiation 358 in all directions including into the ceramic tube 352. The water vapor particles 360 shown as small circles within the tube 352 may be directly impacted by the coherent radiation 362 which is emitted by the host/sensitizer combination included in the walls of ceramic tubes 352. It may be noted, that for convenience in illustration, the manganese oxide particles are shown spaced apart in FIG. 12; however, in practice they would be filling all of the space within the reaction chambers which is not filled with the ceramic tubes 352.

Host/Sensitizers for Water Vapor Feedstock

In the tabulation which will be set forth below, suitable host materials and sensitizers for applying radiation to water vapor will be set forth. In this tabulation the chemical symbols for the elements will be employed, and the host material will be listed first followed by the sensitizer material. In each case the absorption band for the host material will initially be given and then the emission wavelength of the sensitizer will be sent forth. Following the tabulation, the absorption characteristic of water vapor as shown in FIG. 10 will be reviewed and the relationship of the emission lines of the sensitizers to the absorption bands of the water vapor will be discussed.

(a) $Ca\,WO_4 : Nd^{3+}$
   Absorption = 0.74 microns – 0.76 microns    Where Ca, (Calcium)
   Emission = 1.065 microns                         W, (Tungsten)
                                                Nd, (Neodymium)

(b) $Ca\,WO_4 : Nd^{3+}$
   Absorption = 0.87 microns – 0.89 microns    (Same)

Emission = 1.3372 microns (c) $Y_3Al_5O_{12} : Er^{3+}$                                  Where
   Absorption = 0.46 microns – 0.47 microns    Y, (Yttrium)
   Emission = 1.6602 microns                       Al, (Aluminum)
                                                   Er, (Erbium)

(d) $Y_3Al_5O_{12} : Er^{3+}$
   Absorption = 0.52 microns – 0.54 microns    (Same)

(e) $CaF_2 : U^{3+}$                                            Where
   Absorption = 1.2 microns – 1.3 microns      Ca, (Calcium)
   Emission = 2.5111 microns – 2.613          F, (Fluorine)
                          microns                       U, (Uranium)

In the foregoing tabulation it may be noted that there are only three separate combinations of host and sensitizer materials which are being employed. More specifically, the combination of calcium tungstate and neodymium produce output radiations both at 1.065 microns and also at 1.3372 microns as set forth in examples (a) and (b). It may be noted that the absorption wavelengths for the two output emissions differ correspondingly. The combination tabulated in examples (c) and (d) set forth above include yttrium aluminum oxide as the host material and erbium as the sensitizer. In this case, the emitted radiation for both (c) and (d) is at 1.6602 microns; however, the absorption for the two examples is at different frequencies. The final example (e) using calcium fluoride as the host material and uranium-3 as the sensitizer was mentioned above.

With regard to the matching of the emitted radiation from the sensitizers with the absorption bands shown in FIG. 10 for water vapor as a feedstock, the high absorption band for water vapor extending from about 2.4 microns to about 3.1 microns is well located to receive emitted energy in the 2.5 microns to 2.6 micron wavelength region from example (e) tabulated above. With regard to examples (a) through (d), a cursory review of the emission wavelengths and the corresponding moderately sharp absorption bands between 1 and 2 microns would indicate that there is not necessarily an exact correspondence. However, it has been determined that there is a certain amount of broadening of the radiation and of the absorption characteristics which occurs at high temperatures; accordingly, with the basic location of the emission lines and the absorption points as indicated in the above table and in FIG. 10, the practical result is good coupling from the emitted radiation to the water vapor molecules at the 1,000° Kelvin temperature at which the system is operative.

With regard to the relative quantities of the host and sensitizer material in the mullite, the quantity of host material should be approximately 25 to 1,000 times greater than the amount of associated sensitizer material. A ratio of approximately 0.5% of sensitizer of the amount of host material is the general order of magnitude which should be employed. In addition, the quantity of each particular category of host and sensitizer material such as those set forth in the tabulation of combinations (a) through (e) set forth above, should be proportioned to the absorption bands of the feedstock which is being irradiated. Thus, in the particular example under consideration, where the host/sensitizer combination (e) using calcium fluoride and uranium-3, is matched to a broad absorption band of water vapor, a larger quantity of this host/sensitizer combination should be employed as compared with combination (a), (b) and combination (c), (d). Thus, in the making of the ceramic tubes, the material which is being prepared might include approximately 88% by weight of mullite, 8% by weight of the host/sensitizer combination (e), and 2% by weight of each of host/sensitizer combinations (a), (b) and (c), (d). Similarly, in the event that the wire mesh is employed, the host sensitizer/sensitizer combinations may be added in the same proportions to stainless steel wire and the combination material drawn into wires and formed into mesh. Alternatively, after the preparation of the stainless steel wire cells, mullite together with the host sensitizer combinations could be applied in several bands in the plastic state around the stainless steel wire mesh cells, and then fired, to produce the desired result. This result, as mentioned above, involves the provision of spaces throughout a body of material constituting a heat reservoir, and locating host/sensitizer combinations around the boundaries of these spaces or voids in the material.

The chemical formula for mullite was given above, and it is again noted that mullite includes aluminum oxide $Al_2O_3$ and silicon dioxide $SiO_2$ in certain proportions noted above. In order to enhance the "HASER" action and increase the energization of the host/sensitizer combinations (a) through (e) set forth above, a material such as chromium, which acts as a sensitizer in cooperation with the aluminum oxide in mullite which acts as the host material. The chromium-aluminum oxide, sensitizer-host combination produces strong output radiation at a number of wavelengths, including output radiation centered at 0.6934 microns, when the $Al_2O_3$ is absorbing energy at 0.5 microns. The radiation centered at 0.6934 is broadened at the high operating conditions so that the radiation extends from 0.6 or 0.65 to 0.75 or 0.8 microns, thus providing supplemental input energy to example (a) set forth hereinabove, which involves absorption at about 0.74 to 0.76 microns. The $Al_2O_3/Cr$ combination may also directly apply energy to the feedstock when the output radiation is of the proper frequency and may also pump other host/sensitizer combinations. When chromium is used it will be present in quantities in the order of five percent by weight or less of the mullite employed as the basic material of the tubes 352 as shown in FIGS. 11 and 12.

Material Requirements

The primary requirements for potential solid-state Maser/Haser materials are, first, that the composition should fluoresce with a suitably high intensity at elevated temperatures by means of thermal energy alone and, second, that the matrix should be transparent or has no absorption transition at the operation frequency; it should also be chemically stable and have no caustic characteristic.

Preferably, the terminal level of the Haser transition of the active ion should be far enough above the ground state so that three of four-level operation is possible and at elevated temperatures.

The lifetime of the metastable level from which the Haser transition originates should be, insofar as possible, equal to the lifetime for spontaneous emission with no constraints imposed by competitive dissipation to the matrix. In four-level operation the lifetime of the terminal level of the transition must be smaller than that of the metastable level; otherwise, a suitable excess population in the upper level cannot be maintained.

This condition is generally obtained when the terminal level lies in the phonon absorption region, preferably between 6000 and 19,000 $cm^{-1}$. In addition, it is helpful for the excited active ion to be unable to absorb photons corresponding in energy to the Haser transition. Where such absorption into a higher level or band is possible, the photon/phonon flux in the particulate cavity is reduced and the metastable level depleted.

For best coherence the active ions should occupy equivalent positions in the host structure, so that there will not be a multiplicity of spectra. When these ions are in completely unique sites, the emission spectrum has the minimum detail and line width consistent with the site symmetry, the crystal field, and the active-ion concentration. In general, the higher the site symmetry the more degenerate the electronic states of the active ion. Therefore, fewer distinct transitions should be observed in fluorescence and, on the average, each emission transition should flouresce a greater portion of the absorbed energy. However, there are also fewer distinct absorption transitions, and certain emission transitions may be favored in a low-symmetry environment. As long as the emission transitions are few in number, the low symmetry environment may prove to be advantageous by virtue of a broader absorption coverage.

Different classes of active ions seldom find optimum environments in the same host structure. Different activator ions are best accommodated in oxides or fluorides, where the cations of the matrix are approximately equal in size to the activator. $Al_2O_3$, MgO, $MgFl_2$, and $ZnF_2$ are typical matrices for transitionmetal ions, $CaF_2$ is particularly useful for divalent rare-earth ions, and $CaWO_4$, $LaF_3$, and $Y_2O_3$ are best suited for trivalent rare-earth ions for lasers. $Y_3Al_5O_{12}$ can readily accommodate both trivalent rare-earth ions and trivalent 3d transition-metal ions. Certain crystals have conveniently disposed matrix absorption bands and these can be used to absorb pumped radiation over a broad spectrum.

The excitation may be subsequently transferred to trivalent rare-earth ions contained in the matrix and therefore, greatly enhance the overall efficiency of fluorescence. It probably is essential to move into the visible region, to obtain continuous operation for molybdates or niobates.

In comparison, materials which have their matrix absorption edges well above the excitation range but absorb strongly as a result of the active ions having strong absorption bands of their own, together with narrow emission lines, can afford very favorable pumping conditions.

Ions such as, $Cr^{3+}$, Chromium, and, $Dy^{2+}$, Dysprosium offer this advantage.

The past decade has provided rapid extension of spectral measurements and theoretical analysis, such that the properties of most of the divalent and trivalent activator species are well understood. The interest in solid-state masers and lasers, has motivated the preparation of various crystals containing divalent rare-earth ion species and the extensive study of their infrared characteristics. Parallel studies of the infrared properties of the transition-metal ions and trivalent rare-earth ions have been equally productive.

The selection of materials for Hasers which will operate in the infrared region depends on the disposition of the vibrational bands in the matrices. Because vibrational levels may drain an electronic state, they should not be too close below the metastable level, or the latter should lie below the vibrational levels in energy.

Suitable coupled pairs which provide a mutual cross relacation can also be used advantageously to minimize loss of efficiency due to fluorescence from levels lying higher than the metastable level of interest and loss to the phonon spectrum. It is also desirable to increase the efficiencies of masers that terminate on phonon levels. This mechanism of operation offers the possibility of a maser that can be tuned over a broad range of frequencies.

Preferred Lattices

Oxygen-dominated compounds are those in which oxygen is a major chemical constituent of the host lattice. They may be classified according to their chemical composition into four groups.

The first group, comprising the simplest compounds, has the generic formula $M_xO_y$, representative numbers being the alkaline earth oxides and $Al_2O_3$, $Y_2O_3$, and $ThO_2$, with $Cr^{3+}$, $Mn^{2+}$, and the rare earths as common activators. Other compounds included in the generic formula are CuO, and ZnS and the other II-VI wide-band-gap compounds.

The second and largest group are the binary oxides, $M_xA_yO_z$, where M is any element of Group II, A or B, and Period 2 to 6, and A is Ti, Zr, V, Nb, Mo, B, Al, Si, Ge, P, As, Sb, or S.

In many cases x = 4y, the oxygens nearly tetrahedrally arranged around the multivalent atom, A.

The common activators are $Mn^{2+}$, $Mn^{4+}$, $Ag^+$, $Sn^{2+}$, $Tl^+$, $Pb^{2+}$, and the rare earths. Included in this group also are the well-known self-activated compounds comprised of tungstates and molybdates, which are commonly called scheelites (although some do not have the scheelite structure). These require no activating impurity, because the energy transitions take place within the anion, although impurity-activated luminescence is also observed.

Of the impurity-activated members of the binary oxides, the borates, phosphates and silicates are the most numerous.

Ternary systems, $M_xA_yB_yO_z$, constitute the third category. M and A and B are the elements listed in the binary systems plus the alkali metals.

The most common activators, other than the rare earths, are those listed with the binary oxides. There are a few ternary compounds not containing tungsten or molybdenum which are believed to be self-activated.

There are many other oxygen-containing inorganic luminescent solids, including a large number of rare-earth salts and impurity-activated nitrites, carbonates, etc. The work on the latter is largely incomplete. The work on the rare-earth salts constitutes a well-studied separate discipline (Diecke et al, 1961).

Considering the small number of possible combinations of simple oxides and activators, it is surprising that new prospects in this group continue to be found. New compounds, however, consisting of oxides of antimony, germanium, thorium, calcium, strontium, yttrium, and gadolinium with various activators have been developed over the last few years.

The valence of manganese in phosphors or compounds is interesting because of its use as an activator in many lattices. Kroger (1948) showed that the broad structureless red or green emission spectra of manganese-activated compounds is generally due to $Mn^{2+}$, whereas the red narrow-banded emission is due to $Mn^{4+}$.

SUMMARY

In the same way that the spectroscopy of atoms provided basic information on atomic structure, careful study of controlled luminescence of solids provide information on band structures and energy levels of impurities and imperfections. In some cases, the spectra of impurities yield, through the application of crystal field theory, information on the symmetry and strength of the crystal field at the impurity site. The absorption or excitation spectra involve electronic states of the system with equilibrium nuclear coordinates characteristic of the ground state; luminescent emission spectra involves electronic states with the equilibrium nuclear coordinates of the emitting state.

Additionally, detailed theoretical knowledge of band structure and of impurities and imperfections obtained from semiconductor and photoconductor research provides understanding of the luminescence of these materials.

Luminescence is generally investigated as a steady-state phenomenon, wherein the compound interacts with the excitation source and emits radiated energy continuously. The thermodynamic parameters of the compound remain time independent at every point in the system, despite the occurrence of excitation, emission, and dissipative processes.

Irreversible thermodynamics is concerned with just such open systems, which interact with their environment in a stationary way.

It is a principle of irreversible thermodynamics that the entropy production is positive in every macroscopic region of the system undergoing irreversible processes.

Macroscopic regions refer to regions large enough for microscopic fluctuations to exist but small enough for approximate equilibrium to exist within each region. We are especially interested in the more complex excitation mechanisms involving energy transfer between different macroscopic regions not in equilibrium with each other.

Light Absorption and Color

An electromatic radiation, (such as radiowave, light, and X-ray) can be characterized by its particular wavelength, LAMBDA, $\lambda$ (measured in cm or A), or by its wave number, NU, $\nu$ (the reciprocal of the wavelength), $\nu = a/\lambda$, commonly expressed in reciprocal centimeters, $cm^{-1}$.

Each unit of radiation (a photon) corresponds to a quantum of radiant energy, E, which is directly proportional to the wave number, $\nu$. Since chemical calculations are founded on a mole basis, in discussing the relationship between radiant energy and chemical processes (responsive activators and hosts) it is convenient to express radiant energy in kcal/mole of photons. We can do so with this accepted relationship: the radiant energy in 1 mole of photons, with $\nu = 350$ cm$^{-1}$, is equal to 1 kcal.

Therefore, we can obtain the energy (expressed in kcal/mole) for photons of a given wave number simply by multiplying the value of $\nu$ expressed in cm$^{-1}$ by the conversion factor $$\frac{1 \text{ kcal/mole of photons}}{350 \text{ cm}^{-1}}.$$

For example, the energy of light photons with $\nu = 20,000$ cm$^{-1}$ is:

$$\text{energy} = 20,000 \times \frac{1 \text{ kcal/mole of photons}}{350 \text{ cm}^{-1}} =$$

57.1 Kcal/mole of photons

-continued and the energy of a single photon of $\nu = 20{,}000$ cm$^{-1}$ is:

$$\text{energy 1 photon} = \frac{57.1 \text{ kcal/mole of ph.}}{6.02 \times 10^{23} \text{ photons/mole of ph.}} = 9.48 \times 10^{-23} \text{ Kcal/photon.}$$

The wave number, and the energy, of electromagnetic radiations varies within an extremely wide range — $\nu = 10^{14}$ cm$^{-1}$ for the $\gamma$-rays emitted in nuclear reactions to $\nu = 10^{-6}$ cm$^{-1}$ for radiowaves. In between these two extremes, there is a continuum of radiations of intermediate wave numbers — the "visible region", which extends approximately from 27,000 cm$^{-1}$ to 13,500 cm$^{-1}$.

In general, when white light strikes a substance, part of the light is absorbed and part is transmitted (if the substance is transparent) or part is reflected (if the substance is opaque). A substance may absorb preferentially the light photons of one (or more) region(s) of the spectrum, so that the transmitted light or the reflected light is relatively richer in the radiations of the remaining regions.

The combined effect of these remaining radiations is observed as a particular color (when it is in the visible spectrum).

For example, a substance that, when exposed to white light, absorbs almost all photons in the entire yellow - to - violet region (say from 17,000 to 27,000 cm$^{-1}$) will "appear red", because only the radiations in the red region of the spectrum (13,500 to about 17,000 cm$^{-1}$), which are not absorbed, remain to be observed.

Similarly, a substance that "appears yellow" absorbs photons of both the green-to-violet region (from 19,000 cm$^{-1}$ to 27,000 cm$^{-1}$) and the red region (from 13,500 to 16,000 cm$^{-1}$) of the visible spectrum.

Since light (radiation) is energy, the absorption of radiation is absorption of energy; it is well known, that, if a substance absorbs light, the corresponding absorbed energy may be used to promote certain atoms, ions, or molecules of a substance from "ground-state" to an "excited state". For example, an atom, ion, or molecule which absorbs a photon of a given wave number takes on a 'quantun' of energy that may serve to promote one electron from a lower energy orbital to a higher (available) energy orbital. In general, different electronic transitions involve the absorption of different quanta of energy. Haser Design Considerations Some of the factors which are involved in the design of Haser apparatus include the following:

(a) Thermally isolated chamber.
(b) Sensitizers-activators responsive to input heat-energy frequencies.
(c) Design amounts of "impurity" sensitizers required.
(d) Design the host solid while considering the following:

(1.) Lattice Vibrations
 (1.1) Geometry of crystalline solids. (
 (1.2) Crystal lattice and reciprocal lattice.
 (1.3) Brillouin zone and g-space.
 (1.4) Lattice vibrations of an infinite crystal with one atom per unit cell.
 (1.5) Lattice vibrations of a finite crystal with one atom per unit cell.
 (1.6) Lattice vibrations of a crystal with more than one atom per unit cell.
(2.) Thermodynamics of Phonons
 (2.1) Density matrix of an ensemble
 (2.2) Internal energy of a phonon gas.
 (2.3) Einstein and Debye approximations of the density of (A) phonon states.
 (2.4) Phonons and photons; similarities and differences.
(3.) Ion-Photon Interaction: Absorption and Emission of Radiation
 (3.1) Ion-radiation interaction.
 (3.2) Expansion of the interaction hamiltonian. Different types of radiation.
 (3.3) Density of final states
 (3.4) Transition probability per unit time.
 (3.5) Dipole radiation.
 (3.6) Selection rules for radiative transistion
 (3.7) Selection rules for transitions between eigenstates of angular momentum.
 (3.8) Selection rules for atomic systems.
 (3.9) Electric dipole radiation.
 (3.10) Magnetic dipole radiation.
 (3.11) Electric quadrupole radiation.
 (3.12) Selection rules for ions in crystals.
 (3.13) Intensities of radiative transitions
(4.) Ion-Vibration Interaction: Radiationless Processes, Thermal Shift, and Broadening of Sharp Spectral Lines
 (4.1) Ion-vibration interaction.
 (4.2) Radiationless processes in a crystal-absorption and emission of a phonon.
 (4.3) Raman processes.
 (4.4) Orbach processes.
 (4.5) Multiphonon processes.
 (4.6) Line broadening mechanisms
 (4.7) Probability densities and superposition of probability densities: Voigt profile.
 (4.8) Thermal broadening of sharp lines.
 (4.9) Raman scattering of phonons
(5.) Vibrational-Electronic Interaction
 (5.1) Ion-vibration interaction in molecular complexes.
 (5.2) Vibronic spectra of molecular complexes.
 (5.3) Vibronic lines in absorption.
 (5.4) Selection rules for vibronic processes.
 (5.5) Space groups and lattice vibrations.
 (5.6) Normal modes of vibrations in crystals.
 (5.7) Lattice absorption in perfect crystals.
 (5.8) Phonon activation due to impurity ions in crystals.
 (5.9) Selection rules for vibronic transitions due to magnetic impurities in crystals.

Specific Examples

Some underlying principles involved in the selection of Haser systems have been set out hereinabove and a preferred embodiment has been described which involves water vapor as a feedstock and the generation of hydrogen and/or hydrogen peroxide. It is to be understood that the Haser concept is not limited to the specific embodiment described herein but has more general applicability in the conversion of broad spectrum heat energy or radiation to particular frequencies which lie within the absorption band or bands of any selected feedstock.

The feedstock may be gaseous or liquid or even a slurry, and may be brought into proximity with the heat reservoir and associated host and sensitizer material in any desired and practical manner. The heat in the heat reservoir may be generated in any suitable manner including the use of the exothermic reactor for generating hydrogen and hydrogen peroxide and/or the combustion of the hydrogen and hydrogen peroxide.

The feedstock may for example be directed through the heat reservoir by a pipe suitable coiled to provide for adequate exposure to the radiation. The pipe may be transparent to the radiation being applied to the feedstock; or alternatively, the pipe may be made of material containing the specially selected host and sensitizer material.

In the following examples, a number of reactions are set forth and these are followed by an identification of a host and sensitizer material which will concentrate the broader spectrum heat energy to one of the absorption bands of the feedstock. Incidentally, in the following examples, in addition to the standard symbols for the elements, the following abbreviations are used: Et for ethyl, $C_2H_5$; Ph for phenyl, $C_6H_5$; Pr for propyl, $C_3H_7$; and Bu for butyl, $C_4H_9$. In addition to the host and sensitizers shown in each of the following examples, $Al_2O_3$ in mullite and $Cr +3$ may advantageously be used (absorption at 0.5 microns; emission centered at 0.6934 microns). As noted above, the mullite may conveniently be employed to physically support the host and sensitizer materials. The actual examples follow:

Example No. 1

$B_2H$, $Et_2O$ (solution) →
  Hydrobenzoin, Isohydrobenzoin = (Reaction)
$Al_2O_3$ (millite) : $Cr^{3+}$    +    $Sr F_2 : Sm^{2+}$
Absorption = 0.5 microns          Absorption = 0.58 - 0.68 micron
Emission = 0.6934 ± 0.1            Emission = 0.6967 micron
micron

Example No. 2

AcH, $NH_3$, HCN(aq.) → $C_6H_{12}O_3N_2$ = (Reaction)
$LaF_3 : Pr^{3+}$
Absorption = 0.43 - 0.48 micron
Emission = 0.5985 micron

Example No. 3

PARALDEHYDE, $O_2$ → $H_2O_2$ = (Reaction)
$Ca F_2 : Sm^{2+}$
Absorption = 0.4 - 0.45 micron
Emission = 0.7085 micron

Example No. 4

HCHO, $FeCl_5$ (aq.) → $FeCl_2$, $HCO_2H$, HCL = (Reaction)
                               (glycolaldehyde)
$Y_2O_3 : Eu^{3+}$
Absorption = 0.2 - 0.28 micron
Emission = 0.6113 micron

Example No. 5

$B_2H$, Aromatic Ketones → Polymers, other Ketones,=(Reaction)
                            Benzoates
$Y_3Al_5O_{12} : Yb^{3+}$
Absorption = 0.9 - 1.0 microns
Emission = 1.01 microns

Example No. 6

$B_2H$, $PhNO_2$ → $B_2OH$, Several Nitrogen Compounds=(Reaction)
$Nd^{3+} : Cr^{3+}$
Absorption = 0.5 micron
Emission = 1.0612 microns

Example No. 7

$Me_2CO$, $Et_2O$ (solution) → 150 - Propyl Alcohol,
                                Additional Compounds=(Reaction)
$Ca WO_4 : Nd^{3+}$
Absorption = 0.57 - 0.60 micron
Emission = 0.9145 micron

Example No. 8

Cyclohexanone → Caproic Acid, Resin, Aldehyde = (Reaction)
$CaF_2 : Tm^{3+}$
Absorption = 0.39 - 0.46 micron
Emission = 1.116 microns

Example No. 9

Carvone, EtOH (aq.) →    Ketone Resembling Camphor,
                          Resin = (Reaction)
$Ca WO_4 : Pr^{3+}$
Absorption = 0.43 - 0.49 micron
Emission = 1.0468 microns

Example No. 10

Camphor, EtOH (aq.) →    Campholenic Acid, = (Reaction)
                          $A_cH, C_{10}H_{16}O$
$Ca F_2 : Dy^{2+} : Sm^{2+}$
Absorption = 0.58 - 0.68 / 0.8 - 1.0 micron
Emission = 0.6967 micron
           2.36 microns

Example No. 11

Coumarin, EtOH, Paraldehyde, → Hydro - DI - Coumarin
or $C_6H_6$ (solution) = (Reaction)
$CaWO_4 : Nd^{3+} : Ho^{3+}$
Absorption =   0.57 - 0.6  0.74 - 0.76
               0.44 - 0.46 micron
Emission =     0.9145 micron
               1.065 microns
               2.046 microns

Example No. 12

Benzoin, EtOH (solution) → Hydrobenzoin, $AcH_3$, Isoform
                            Resin = (Reaction)
$Y_2O_3 : Eu^{3+}$
Absorption = 0.87 micron -continued Emission — 0.6113 micron

Example No. 13

Quinone, $Et_2O$ (solution) → Hydroquinone, Resins = (Reaction)
Same Host/Sensitizer; Absorption; and Emission as Nos. 1, 3 and 4

Example No. 14

Thymoquinone, $Et_2O$ (solution) → Polymer (Polythymoquinone) = (Reaction
Same Host/Sensitizer; Absorption; and Emission as Nos. 1 and 3

Example No. 15

4 - Me Quinoline → Resin, Alkali Soluble Product = (Reaction
Same Host/Sensitizer; Absorption; and Emission as Nos. 5, 6, and 8

FIG. 13 is a schematic showing of an apparatus for a continuously processing feed stock such as the materials disclosed in the foregoing examples, or steam, of course. In FIG. 13 the reaction chamber 402 is provided with upper and lower manifold chambers 404 and 406 which are separated from the main portion of the reaction chamber 402 by apertured plates 408 and 410. Within the reaction chamber 402 are a large number of the ceramic tubes 412 such as those shown in FIG. 11. All of the space within chamber 402 apart from that occupied by the tubes 354 is filled with a reactant such as manganese oxide or other reactants disclosed elsewhere in the present case and in my prior co-pending specification cited above.

A heat or radiation exchanger including upper and lower manifold structures 414 and 416 as well as the interconnecting tubes or pipes 418 exposes the feed stock, which is applied through input tube 420 and brought out through tube 422, to the high temperatures and radiation present within the main reaction chamber 402.

At the center of the apparatus shown in FIG. 13 is a burner 424 to which a lower inlet pipe 426 and an upper outlet pipe 428 are connected. This central burner unit may be of the type shown in FIG. 9 of the drawings and as described hereinabove. The entire reaction chamber 402 shown in FIG. 13 is fully insulated and mounted as shown in FIG. 9, and equipped with suitable automatic valving of the type described above in connection with other embodiments of the invention.

In operation, steam is initially supplied to the reaction chamber 402 through inlet line 430 when valve 432 is opened. Of course prior to this initial step, the reaction chamber 402 has been preheated to a temperature in the order of 1000° Kelvin, and the steam is supplied under high pressure. Hydrogen is then displaced by the action of the reactant, and the host/sensitizer materials included in tubes 412, as described above. Hydrogen $H_2$ and hydrogen peroxide $H_2O_2$ are drawn off through the upper manifold 404 and the connecting line 434 through value 436. During the hydrogen displacement phase of the cycle, additional oxygen may be supplied through line 438 via valve 440. The additional oxygen promotes the formation of hydrogen peroxide, which is, with the hydrogen, drawn off through line 434.

The overall cycle of reaction chamber 402 may be substantially as indicated by one of the two plots shown in FIG. 7. Accordingly with the steam valve 432 and the valve 436 to the hydrogen storage tank both closed, the vacuum may be applied to the reaction chamber 402 so that disproportionation of the oxygen from the reactant takes place.

While the hydrogen displacement at high pressure and the oxygen disproportionation phase of the cycle at low pressure is occurring in the main reaction chamber 402, the feed stock may be continuously passed through the heat and radiation exchanger 414, 416, 418, at a suitable rate to maintain the desired high temperature and high level of radiation of the feedstock. Incidentally the tubes 418 interconnecting the upper chamber 414 and the lower chamber 416 may be made of mullite including the host/sensitizer materials mentioned in the various examples given above. Similarly the manifolds 414 and 416 may be made of such materials. Alternatively the elements 414, 416, and 418, may be made of metal, such as stainless steel, to which suitable quantities of host/sensitizer materials have been added in order to give the desired intimate irradiation action with regard to the feed stock.

Instead of using a single reaction chamber as shown in FIG. 13, a heat and irradiation exchange unit could be employed with a multiple reaction chamber apparatus such as that shown in FIG. 9. When used with a multiple reaction chamber arrangement such as that shown in FIG. 9, of course the heat exchange elements must make sealing engagement with the walls of the individual reaction chambers which will be at different pressures during different portions of the individual staggered cycles in the different reaction chambers.

It may be noted that, in accordance with disclosures in my prior co-pending patent application cited above, and teachings found elsewhere in the present specification, the hydrogen and $H_2O_2$ "tailings", obtained as a vacuum is being drawn on line 438, and such output hydrogen and/or hydrogen peroxide from line 434 as may be desired, may be applied through line 426 to the central burner 424. This may serve the purpose of supplying additional heat to the entire unit to permit more rapid flow of feed stock through lines 420 and 422 without loss of temperature in reaction chamber 402.

Energy Balance

In my prior co-pending patent application an "Energy Balance" section was included. In the present specification, a portion of the prior analysis will be set forth, and a more thorough energy analysis involving the new material in this application will be included.

In view of the fact that the apparatus of the present type and as disclosed in my prior application are exothermic on a net basis and also produces hydrogen or hydrogen peroxide which can be burned, there have been some suggestions that certain socalled Laws of Thermodynamics are being violated. This is of course not the case, as will be developed by the Energy Balance analysis set forth below.

From an overall standpoint, the present system may be viewed as providing an energy balance and not violating any "Laws of Thermodynamics" as a result of the low energy content gaseous products which are released in the course of the process. These low energy gaseous products may include HO and HO2, which are less well known gaseous products. When these gaseous products are released into the atmosphere, it is believed that they absorb high frequency radiations, and eventually change state to become hydrogen gas, oxygen gas, water vapor, atomic hydrogen and atomic oxygen. In one sense, therefore, the present system may be considered to utilize solar energy.

The stoichiometric reactions set forth below represent one of several modes of operation which may obtain in implementations of the present invention.

The foregoing equations may be analyzed from two different standpoints. Incidentally, it may be noted that the "2HO" designated (4) in the upper equation is actually evolved in the disproportionation phase. In addition, a portion of the hydrogen gas H2 from (6) in the upper equation is an input in the lower equation which combines with the disproportionated oxygen to form HO. Also, of course, the incident photons are applied in the atmosphere, and not in the apparatus per se. It should also be noted that the O2 input designated (2) is essentially optional and may involve the venturi unit 212

Now, from a Gibbs Free Energy (G) Analysis standpoint involving Enthalpy (Heat, H), Entropy (S), and temperature T, the following analysis obtains:

In the following analyses, the enthalpies and entropies of the starting reactants are subtracted from the enthalpies and entropies, respectively, associated with the products. The letters "in" have been associated with the initial values relating to the starting products.

Oxygen Sequestering Reaction (Upper Equation designated "Stoichiometric Reaction")
$\Delta H°_{form}$: 2(−70.6) (in) 2(−228.6) (in) 4(−126.7) −43.2
$\qquad\qquad\qquad\qquad\qquad\qquad\qquad\qquad$ −43.2 −33.96
$S°_{form}$: 2(+45.11) (in) 2(+26.4) (in) 4(+12.7) +43.89
$\qquad\qquad\qquad\qquad\qquad\qquad\qquad\qquad$ +43.89 +56.01
$\Delta H°_{react}$: −627.16−(−598.4) = −28.76 Kcal/Mol-Eqn
$\Delta S°_{react}$: +194.59−(+143.02)= +51.57 Cal/Mol-Eqn × Deg.
$T\Delta S: \dfrac{1000_{degrees} \times (+51.57)}{1000} = +51.57$ Kcal/Mol-Eqn
$\Delta G: \Delta H - T\Delta S = -28.76 - (+51.57)$
$\Delta G: = -80.33$ Kcal/Mol-Eqn Reverse Reaction
$\Delta H°_{form}$: 4(−126.7) (in) 2(−228.6) −43.2
$S°_{form}$: 4(+12.7) (in) 2(+26.4) +43.89
$\Delta H°_{react}$: −500.4 − (−506.8) = +6.40 Kcal/Mol-Eqn
$\Delta S°_{react}$: +96.69 − (+50.8) = +45.89 Cal/Mol-Eqn × Deg.
$T\Delta S: 1000_{degrees} \times (+45.89) = +45.89$ Kcal/Mol-Eqn

STOICHIOMETRIC REACTION (ONE OF SEVERAL MODES)

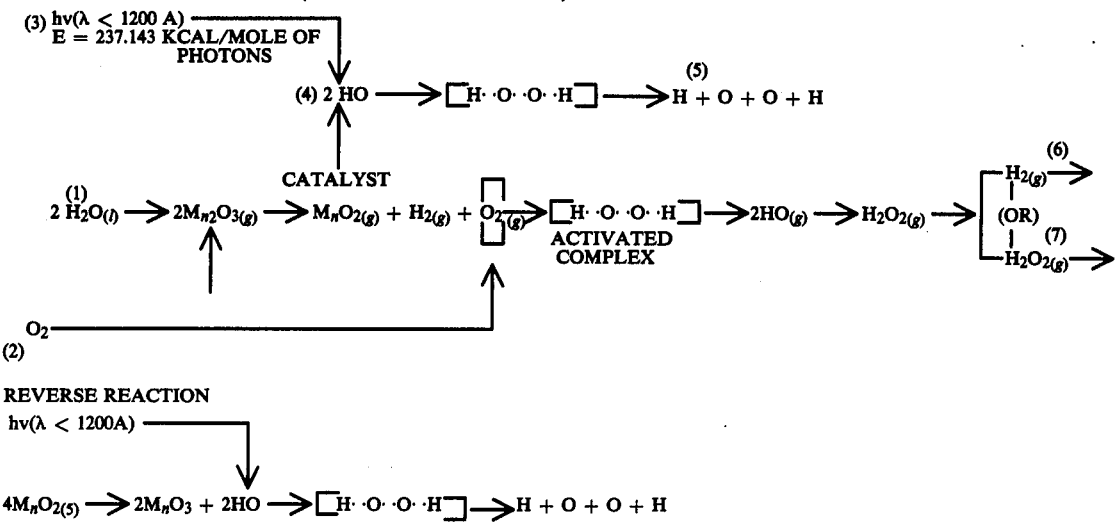

REVERSE REACTION $hv(\lambda < 1200A)$ $4M_nO_{2(s)} \longrightarrow 2M_nO_3 + 2HO \longrightarrow [H\cdot \cdot O\cdot \cdot O\cdot \cdot H] \longrightarrow H + O + O + H$ or inlet 217, of FIG. 6, whereby additional O2 is supplied to generate H2O2, as noted above.

Now, the upper equation will be analyzed from a potential energy standpoint:

| POTENTIAL ENERGY IN: K.Cal | |
|---|---|
| (1) 2 H2O | 141.2 |
| (2) O2 + H2 | 43.2 } = 421.543 K.Cal. |
| (3) h γ | 237.143 |

| POTENTIAL ENERGY OUT: K.Cal | |
|---|---|
| (4) 2HO | 43.2 |
| (5) H+O+O+H | 223.96 |
|  | = 330.639 K.Cal (H2 Out) |
| (6) H2, or | 63.479 } or |
| (7) H2O2 | 114.262 / 381.422 K.Cal (H2O2Out) |

Efficiency (H2 Out) = 0.78
Efficiency (H2O2 Out) = 0.90

Actually, there is often a combination of H2 and H2O2 resulting in an intermediate efficiency.

$\Delta G : \Delta H - T\Delta S = + 6.40 - (+45.89)$
$\Delta G = -39.49$ Kcal/Mol-Eqn Complete Cycle $(\Delta H) = -28.76 + (+6.40) = -22.36$ Kcal/Mol-Eqn
$(\Delta S) = +51.57 + (+45.89) = +97.46$ Kcal/Mol-Eqn From the foregoing analysis, it may be noted that the heat or enthalpy for the hydrogen generation portion of the cycle is equal to −28.76 K Cal/Mol-Eqn, which means that the reaction is exothermic. For the "Reverse Reaction" or the oxygen disproportionation part of the cycle, the heat or enthalpy figure is +6.40 K. Cal/Mol-Eqn. This means that the disproportionation part of the cycle is endothermic, but that the heat required is much less than that generated in the other portion of the cycle. With thoroughly insulated equipment the heat generated during the exothermic portion of the cycle, in the same or other adjacent reaction chambers, is more than sufficient to provide the heat needed during the disproportionation part of the cycle. It may also be noted that the positive entropy value for the "Reverse Reaction", or the disproportionation cycle, indicates that this reaction will go forward spontaneously.

Energy Balance — Second Mode

Another pair of (1) Displacement of Hydrogen and (2) Disproportionation reactions appears below, together with a classical Gibbs Free Energy Analysis. Also included are the text citations for the entropy and enthalpy values used in the analysis. The following mode emphasizes the production of hydrogen peroxide, $H_2O_2$, and carries over its use in the disproportionation part of the cycle. It may also be noted that the first mode and second mode presentations are not precisely comparable as $H_2O_{(e)}$ is assumed as an input for the first mode, and $H_2O_{(g)}$ is assumed as an input for the second mode as set forth below. As indicated by the negative value of the enthalpy for the two reactions of the second mode, it is also exothermic on an overall basis.

The equations for (1) hydrogen displacement and (2) oxygen disproportionation, are set forth below, together with their associated Enthalpy (H), Entropy (S) and Gibbs Free Energy functions.

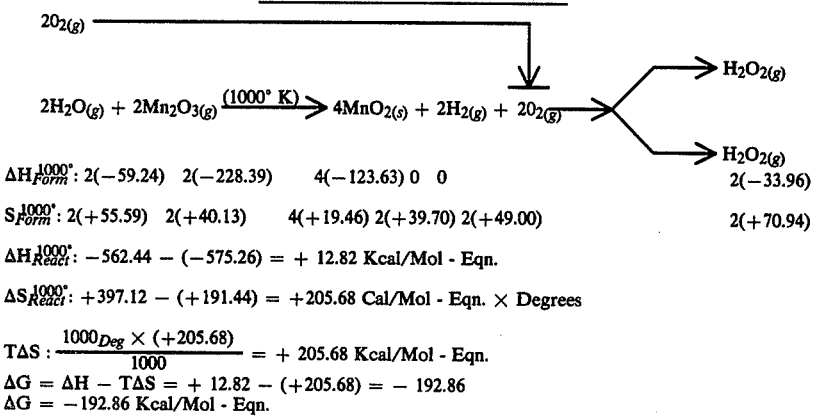

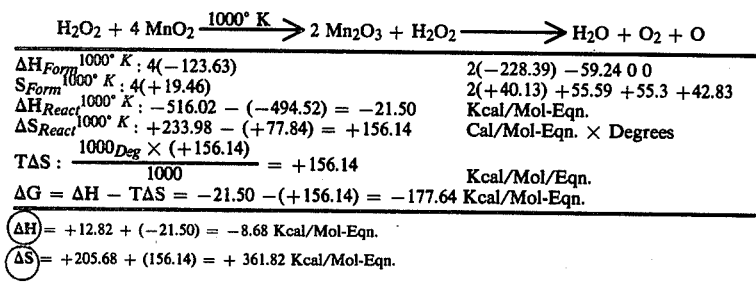

$\Delta H_{Form}^{1000° K}$: 4(−123.63)      2(−228.39) −59.24 0 0
$S_{Form}^{1000° K}$: 4(+19.46)      2(+40.13) +55.59 +55.3 +42.83
$\Delta H_{React}^{1000° K}$: −516.02 − (−494.52) = −21.50      Kcal/Mol-Eqn.
$\Delta S_{React}^{1000° K}$: +233.98 − (+77.84) = +156.14      Cal/Mol-Eqn. × Degrees $T\Delta S : \dfrac{1000_{Deg} \times (+156.14)}{1000} = +156.14$ Kcal/Mol/Eqn.

$\Delta G = \Delta H - T\Delta S = -21.50 -(+156.14) = -177.64$ Kcal/Mol-Eqn.

$\boxed{\Delta H}$ = +12.82 + (−21.50) = −8.68 Kcal/Mol-Eqn.

$\boxed{\Delta S}$ = +205.68 + (156.14) = + 361.82 Kcal/Mol-Eqn.

The values for Enthalpy (H) and Entrophy (S) used in the foregoing analyses are all taken from published texts as follows:

1. $MnO_2$ Enthalpy (H) 900° K. = 123.63
   Entropy (S) 900° K. = 19.46
2. $Mn_2O_3$ Enthalpy (H) 1000° K. = −228.39
   Entropy (S) 1000° K. = 40.13

Selected values of Chemical Thermodynamic Properties, by F. D. Rossini et al, and U.S. Government National Bureau of Standards Accession No. 6500390, N.B.S. Circular No. 500, dated Feb. 1952, pages 122 ($MnO_2$) and 123 ($Mn_2O_3$)

3. $H_2$ Entropy (S) 1000° K. = 39.70

Thermodynamic Properties of the Elements Published November 1956, American Chemical Society, 1155 Sixteenth Street, N.W., Washington 6, D.C.

4. $H_2$ Enthalpy (H) 1000° K. = 0 (By Definition)
5. $O_2$ Enthalpy (H) 1000° K. = 0 (By Definition)
6. $O_2$ Entropy (S) 1000° K. = 49.0
7. $H_2O$ Enthalpy (H) 1000° K. = 59.24
   $H_2O$ Entropy (S) 1000° K. = 55.59

"Thermodynamic Properties of Minerals and Related Substances . . ." - Geological Survey Bulletin 1259 Washington, D.C., U.S. Dept. of the Interior, 1968, p. 114.

8. OH Enthalpy (H) 1000° K. = 9.13
9. $H_2O_2$ Enthalpy (H) 1000° K. = 33.46
10. OH Entropy (S) 1000° K. = 52.49
11. $H_2O_2$ Entropy (S) 1000° K. = 70.94
12. $H_2O$ Entropy (S) 1000° K. = 55.59

TRC Tables, Selected Values of Properties of Chemical Compounds, Thermodynamics Research Center, Texas A&M University; Table 2 I T for items 9–12 above; Table 2 I W for items 7 and 8 above.

From the negative value of -8Kcal/Mol-Eqn. of the enthalpy (heat) of the entire reaction, including both diplacing hydrogen from water vapor and disproportionating oxygen from the reactant, it is clear that the process is exothermic, in addition to generating hydrogen and/or hydrogen peroxide. And this surprising result, in one or the other or a combination of the modes described in the foregoing equations has been confirmed by the operation of prototypes using manganese oxide as the reactant.

Set forth below is a further analysis involving the photon dissociation of $H_2O$, and an examination of the energy "borrowed from nature" and "returned to nature", or to the environment. In connection with the following analyses, it may be noted that the energy for photon dissociation of the $H_2O$ is obtained from the heat reservoir of hot reactant which is of course maintained at an elevated temperature by the net exothermic nature of the hydrogen displacement and oxygen disproportionation cycle. When mention is made of the combustion of $H_2O_2$ in the following analysis, this combustion is in the course of performing useful work such as driving an engine, or the like, apart from the reaction chamber as described herein.

PHOTON DISSOCIATION OF $H_2O_{(g)}$

A. Average number of $<(0.008)>$ particulates in 539.0 Cu. in. reaction chamber is equal to $1.130859375 \times 10^9$ B. Assuming radiated energy frequency averages
$<F> = 3.64 \times 10^{14}$ (second)
$\therefore (1.130859375 \times 10^9) \times (3.64 \times 10^{14})$
Photons $= 4.116328125 \times 10^{23}$ (second)

C. Assuming a continuum of 15 seconds
$15.0 \times (4.116328125 \times 10^{23})$
Photons in 15.0 Seconds $= 6.174492188 \times 10^{24}$ D. Since there are $6.02 \times 10^{23}$ photons in 1 mole (of photons)

$$\frac{6.174492188 \times 10^{24}}{6.02 \times 10^{23}}$$

Energy (15 sec.) = 10.256632 moles photons

E. Converting to Kilocalories
$10.256632 \times 26.48$
Energy $= \frac{271.60 \text{ Kilocalories}}{\text{(average)}}$ F. Energy Required to Dissociate (1) Mole $H_2O_{(g)}$
1 Mole = 59.24 Kcal
$\therefore \frac{271.6}{59.24} = 4.58$ Moles $H_2O_{(g)}$ G. (1) Dissociation by Reactant     2.00 Moles $H_2O_{(g)}$
(2) Dissociation by Radiant Energy   4.58 Moles $H_2O_{(g)}$
Total 6.58 Moles $H_2O_{(g)}$ H. 6.58 Moles $H_2O_{(g)}$ = 5.22 cu. ft. $H_2O_{2(g)}$ I. 1 cu. ft. $H_2O_{2(g)}$ = 318 BTU
5.22 (cu. ft.) × 318 (BTU) = 1660.00 BTU
15.0 seconds = 1.660.00 (BTU) = 418.49 Kcal (Potential J. Energy Required to Operate Unit for 15.0 Seconds

| | |
|---|---|
| (1) Dissociating 6.58 Moles Liquid Water at 70.6 Kcal/Mole | = 389.8 |
| (2) Sensible Heat Lost in Gases and Cooling Water | = 22.4 |
| (3) Radiated Heat Losses (all surfaces) | = 5.29 |
| (4) Vacuum Pump (1.0 H.P.) | = 0.27 |
| (5) Water Pressure Pump (1.0 H.P.) | = 0.27 |
| (6) Cooling Fan (Electronic Controls) (0.3 H.P.) | = 0.10 |
| (7) Cam-Motor and DC Controls (0.3 H.P.) | = 0.10 |
| (8) Digital Readouts Power (0.1 H.P.) | = 0.03 |
| (9) Compressed Air (0.5 H.P.) | = 0.14 |
| (10) Compressed Hydrogen (0.5 H.P.) | = 0.14 |
| TOTAL | 418.5 |

K. Energy Balance = Output Minus Input
418.5 − 418.5 = 0

BORROWED FROM NATURE
(during 15.0 sec. period)

| | Kcal |
|---|---|
| A. Energy | |
| 1. 6.58 Moles $H_2O_{(1)}$ × 70.6 Kcal/Mol = | 389.8 |
| 2. Peripheral Equipment (15.0 sec.) | 28.69 |
| (Kcal) TOTAL = | 418.5 |

RETURNED TO NATURE

A. Potential Energy
B. Combuston of 5.22 cu. ft. $H_2O_2$ × 318 BTU/cu.ft.
= 1660.00 BTU
= 418.5 Kilocalories
Required Energy (from J) 418.5 Kcal
− Energy from Combustion, 418.5 Kcal = 0

In closing, reference is again made to my copending patent application Ser. No. 768,808, filed Feb. 15, 1977, in which more detail is presented relative to the temperatures, pressures, and other reactants which may be used. As noted in the prior specification, the temperature of operation should be above the dissociation temperature for oxygen for the reactant being employed at atmospheric pressure. Advantageous high speed results have been achieved with the reactant in the pyroplastic state of incipient fusion Concerning pressures, the pressure during dissociation should be at least as low as atmospheric pressure, and preferably a vacuum should be applied to reduce the pressure to a fraction of atmospheric. The vacuum may be applied to draw the tailings through the burner to extract additional heat from the tailings. During the hydrogen displacement portion of the cycle the pressure should be well above atmospheric to facilitate sequestering of the oxygen by the reactant. Successful results may be achieved with reactants such as MnO with gauge pressures of about 100 to 130 or 150 and up to 500 pounds per square inch. Even higher pressures may be employed. Concerning the active reactant, as mentioned in my prior copending specification, it preferably includes at least one metal having a plurality of valence states. It should also have an oxide which will, when subjected to water vapor at elevated temperature and/or pressure, and preferably both, combine with the oxygen and displace the hydrogen in gaseous form exothermically. The reactant also preferably has the property of disproportionation or dissociation to release the combined oxygen when the temperature is raised or preferably when the pressure is reduced, and when the evolved oxygen is separated from the reactant. Advantageously, the heat required in the disproportionation part of the cycle is significantly less than that generated in the exothermic portion of the cycle when the reactant combines with the oxygen in the steam and releases hydrogen, so the entire cycle is exothermic. Also, the reactant should be susceptible of remaining in the pyroplastic state of incipient fusion during the change in state from one oxidation level to another, and back again, under the described conditions.

Some of the metals and oxides thereof which fulfill the foregoing requirements include (1) antimony, (2) cesium, (3) barium, (4) iron, (5) manganese, (6) chromium, (7) iridium, (8) nickel, and (9) thallium. Other metals which have multiple valence states are known, but most of these have practical problems which preclude their use. Thus, for example, mercury has too low a melting point, and its oxides are unstable. In the case of other metals having multiple valence states, their oxides may be poisonous, they may be caustic or are not available in practical or commercially available quantities. Other metals having multiple valence states have oxides which will not readily disproportionate. Combinations of reactants satisfying the requirements indicated above may be employed in the form of alloys, eutetics, and with other materials to obtain desired temperature and mechanical properties.

FIGS. 14 and 15 are particularly useful in analyzing the apparatus of the present invention from a radiation standpoint. FIG. 14 shows spectral radiant emittance, or power in watts radiated at various wavelengths from a "black body" having a temperature of 1000° Kelvin, while FIG. 15 is a similar plot showing photon emission, or the number of photons emitted at various wavelengths. The FIG. 14 plot drops off more rapidly than that of FIG. 15 because shorter wavelength photons are more energetic and have higher power. In accordance with known principles, the energy is directly proportional to the frequency and inversely proportional to the wavelength. It may also be noted that, in the plots of FIGS. 14 and 15 the visible range is from about 0.4 to 0.7 microns. Accordingly for the temperature of 1000° Kelvin (about 727° Centigrade and about 1341° Fahrenheit), which is plotted in FIGS. 14 and 15, the radiation peaks in the spectrum at wavelengths somewhat longer and at frequencies slightly lower than the visible band.

FIGS. 16, 17, and 18 show a system for applying radiant energy to a feedstock. In FIG. 17 the feedstock is applied to reaction chamber 302 by inlet tube 304 which is connected to manifold 306. Manifold 306 is supported by insulating ceramic material 308 which may either by in the form of a ring or a series of supporting blocks.

The reaction chamber has an outer cylindrical stainless steel wall 310 secured to upper and lower stainless steel end plates 312 and 314. The chamber 302 is provided with a cylindrical ceramic liner 316 and upper and lower inner ceramic end plate 318 and 320. Suitable insulation 322 such as ceramic foam and an outer casing 324 are also provided.

A series of coated wires 326 extend for most of the length of the chamber 302 between upper and lower electrically conducting support members 328 and 330. As shown in FIG. 16, the wires 326 are made up of an inner wire 332 of conducting or resistive material and an outer coating 334 of ceramic material of radiation emitting material of one or more of the types previously described.

The upper and lower wire supporting members 328 and 330 may be held apart by the elongated ceramic member, and the metal rod 338 which extends into the lower hollow end of ceramic member 336. The coated wires 326 are heated up by the application of electricity to power input conductors 340 and 342 to a temperature in the order of 1000° Kelvin. This causes a certain amount of thermal expansion in the wires, and by using a suitable metal rod 338 which has a slightly higher coefficient of thermal expansion, the wires 326 may be maintained in operative positions relative to each other.

In the case of a process involving steam as the feedstock and where it is desired to have hydrogen gas and $H_2O_2$ as the output product, air may be supplied either through input tube or pipe 304 and/or through separate input 344 to the apertured ring shaped mainfold 346 which is held in position by supports 348. Output product is drawn off through pipe 350.

In practice, and as indicated in the block diagram of FIG. 18, air may be supplied to the reaction chamber 302 either through input 304 along with the input feedstock such as steam, or through input 344 at the upper zone of the reaction chamber. When the air is supplied through input 344, toward the upper end of 302, it combines with the previously-formed hydrogen, resulting from dissociation of the water vapor, to form $H_2O_2$.

Other blocks shown in FIG. 18 include a source of electrical power 354, a supply of liquid water at 356, a steam formation unit 358, and a storage container 360 for fuel gas such as gaseous hydrogen $H_2$ and hydrogen peroxide $H_2O_2$. The supply line for water is indicated at 362, and that for air at line 364.

As indicated by line 366, a portion of the fuel gas which is formed may be fed back to the steam formation unit 358 to increase the temperature of the water vapor being supplied to reaction chamber 302. After the unit is in operation for a short period of time, the steam is supplied to the reaction chamber 302 at a temperature well above the intended operating temperature of reaction chamber 302 so that little or no electricity need be supplied from the source 354. Thus, for example, with steam being supplied at between 1100° and 1200° Kelvin, the temperature of 1000° Kelvin desired within the reaction chamber 302 may be sustained with the supply of very little or no electricity over line 368.

With reference to FIG. 20, the coated wires 326 are shown supported by a screen 370 which may be made of any suitable high temperature resistant conducting material. The wires 326 are woven in and out of the surface of the screen 370 to form the array as shown in FIG. 17. It may be noted that the frame or support members 328 and 330 of FIG. 17 are shown as being formed of two parts. These two parts are open frame members which clamp the screen 370 as shown in FIG. 20 and support it. If desired or if the conductivity of the particular coating employed in the system is relatively low, the coated wires 326 may be scraped bare and welded contacts made at points such as those indicated at 372 in FIG. 20 to make better conductive engagement with the screen 370 by which electricity is initially supplied to these wires. It is also noted that, instead of using the screen as shown in FIG. 20, the supporting structures 328 or 330 may be simple perforated plates with the coated wires 326 threaded through them.

Now, considering one specific example, the wires 326 of FIG. 17 may be coated with the host and sensitizer materials set forth in examples Nos. 1 and 2 of the 15 examples set forth hereinabove in the present specification.

More specifically, before going into the example in detail, it may be noted that various units are used in the present specification in reference to the wavelength of the radiations which are employed. For reference purposes and for ease in converting various units, it may be noted that the visible range extends from about 4000 Angstrom units to 7000 Angstrom units, with an Angstrom unit being equal to $10^{-8}$ centimeters. Expressed in microns this visible range corresponds to wavelengths from 0.4 to 0.7 microns, with a micron being equal to $10^{-4}$ centimeters. Similarly, when millimicrons are employed to measure wavelength, they correspond to $10^{-7}$ centimeters, and the visible spectrum range is from 400 to 700 millimicrons.

It may also be noted, in converting frequency to wavelength and vice versa that the frequency of light is equal to 3 times $10^{10}$ centimeters, and that the product of frequency and wavelength is equal to the velocity of light. Accordingly, using this simple expression that the product of the frequency times the wavelength is equal to the velocity of light, easy conversion may be made from frequency to wavelength, and vice versa. For convenience, reference is also made to Table I which indicates the location of the visible light band relative to the infrared and ultraviolet frequency bands, in addition to the remainder of the electromagnetic radiation spectrum.

may be noted that the emission, for Example No. 1 was approximately 0.69 microns corresponding to a frequency of approximately $4.34 \times 10^{14}$ cycles per second. This corresponds to a red color in the visible spectrum. Example No. 2 provides a yellow output light with a wavelength of approximately 0.59 microns corresponding to a frequency of approximately 5.08 times $10^{14}$ cycles per second. Incidentlly, another yellow line is produced by the materials of Example 12, with a wavelength of 0.61 micron, corresponding roughly to 4.91 times $10^{14}$ cycles per second.

Referring back to FIG. 17, one-half of the wires extending from support 328 to support 330 are coated with material providing red output radiation such as specified in Example No. 1 referred to above, and one-half of the wires are coated with material providing a yellow output radiation. These wires are threaded through the supports 328 and 330 so as to be interspersed with one another so that the yellow and red output radiation wires are not grouped together but are entirely interspersed with one another.

When feedstock is supplied to the reaction chamber 302, the radiation will be directed from the wires to the medium and the radiation of different frequencies will impinge upon the discontinuities provided by the feedstock vapors and will beat with one another and will be converted into sum and difference frequencies. More specifically, considering examples Nos. 1 and 2, the frequency for the red radiation of Example 1 was approximately 4.34 times $10^{14}$ cycles per second, and the frequency for Example No. 2 was approximately 5.084 times $10^{14}$ cycles per second. One frequency which will be formed as these radiations impinge on the feedstock will be the sum frequency equal to approximately 9.42 times $10^{14}$ cycles per second. This corresponds to a wavelength of about 0.32 microns, in the near ultraviolet frequency spectrum. Water vapor has a number of absorption peaks in the near ultraviolet frequency spectrum and these peaks are broadened by the elevated temperature present at 1000° Kelvin at which the reaction chamber 302 is operated. Accordingly, in addition to the dissociation action produced by the direct radiation at the red and yellow frequency bands, the power-

TABLE I

TABLE 1-2
The Wavelength, Frequency, and Energy of Typical Electromagnetic Radiation

| Approximate Description | Typical Wavelength, A | Frequency, cycles/sec | Wave Number, cm$^{-1}$ | Energy, kcal/einstein | |
|---|---|---|---|---|---|
| Radio wave | $1.00 \times 10^{13}$(1000 m) | $3.00 \times 10^5$(300 kc) | $1.00 \times 10^{-5}$ | 0.0000000286 | |
| Short-wave radio wave | $1.00 \times 10^{11}$(10 m) | $3.00 \times 10^7$(30 Mc) | $1.00 \times 10^{-3}$ | 0.00000286 | |
| Microwave | $1.00 \times 10^8$(1 cm) | $3.00 \times 10^{10}$ | 1.00 | 0.00286 | |
| Far infrared | $1.00 \times 10^5$(10 $\mu$) | $3.00 \times 10^{13}$ | $1.00 \times 10^3$ | 2.86 | |
| Near infrafed | $1.00 \times 10^4$(1 $\mu$) | $3.00 \times 10^{14}$ | $1.00 \times 10^4$ | 28.6 | |
| Visible light | | | | | |
| Red | $7.00 \times 10^3$(700 m$\mu$) | $4.28 \times 10^{14}$ | $1.43 \times 10^4$ | 40.8 | |
| Orange | $6.20 \times 10^3$ | $4.84 \times 10^{14}$ | $1.61 \times 10^4$ | 46.1 | |
| Yellow | $5.80 \times 10^3$ | $5.17 \times 10^{14}$ | $1.72 \times 10^4$ | 49.3 | |
| Green | $5.30 \times 10^3$ | $5.66 \times 10^{14}$ | $1.89 \times 10^4$ | 53.9 | |
| Blue | $4.70 \times 10^3$ | $6.38 \times 10^{14}$ | $2.13 \times 10^4$ | 60.8 | Photo-chemistry region |
| Violet | $4.20 \times 10^3$ | $7.14 \times 10^{14}$ | $2.38 \times 10^4$ | 68.1 | |
| Near ultraviolet | $3.00 \times 10^3$ | $1.00 \times 10^{15}$ | $3.33 \times 10^4$ | 95.3 | |
| Far ultraviolet | $2.00 \times 10^3$ | $1.50 \times 10^{15}$ | $5.00 \times 10^4$ | 142.9 | |
| Schumann ultra-violet | $1.50 \times 10^3$ | $2.00 \times 10^{15}$ | $6.67 \times 10^4$ | 190.6 | |
| Long X-ray | $3.00 \times 10^2$ | $1.00 \times 10^{16}$ | $3.33 \times 10^5$ | 953.0 | Radiation chemistry region |
| Short X-ray | 1.00 | $3.00 \times 10^{18}$ | $1.00 \times 10^8$ | 285,910 | |
| Gamma ray | $1.00 \times 10^{-2}$ | $3.00 \times 10^{20}$ | $1.00 \times 10^{10}$ | 28,591,000 | |

With the foregoing background, reference is again made to examples Nos. 1 and 2 of the 15 numbered examples set forth earlier in the present specification. It ful ultraviolet radiations will have a strong dissociative effect on the water vapor being transmitted through the reaction chamber 302. Incidentally, the energetic nature of the radiations in the near ultraviolet may be noted from the far right-hand column in Table No. I in which the radiation in the near ultraviolet is shown to have an energy level in the order of double that in the red and yellow regions of the visible spectrum.

Attention is also directed to the plot of FIG. 21 showing the absorption characteristic for hydrogen peroxide $H_2O_2$ which is being formed in the radiation chamber 302. More specifically, it may be seen that the absorption coefficient increases rapidly from the near ultraviolet range of 3000 Angstroms, or about 0.3 microns, to the far ultraviolet range toward the left of FIG. 21. Accordingly, with near ultraviolet radiation being employed in the chamber of FIG. 17 (reaction chamber 302) to dissociate water vapor, it may be noted that the desired product gas $H_2O_2$ will be little affected and will be essentially transparent to this near utraviolet radiation and will thus remain in its $H_2O_2$ chemical state, after it is formed, without adverse effect from the near ultraviolet radiation.

FIG. 19 shows a alternative reaction chamber 376 which is divided into an upper section 378 and a lower section 380. Dividing these two sections of the chamber is a perforated ceramic plate 382. In addition, two different sets of coated wires 384 in the upper section and 386 in the lower section, are provided. These two sets of wires are electrically interconnected by the links 388 which extend through the ceramic plate 382 and join the lower support 390 for the upper set of wires 384 to the upper support 392 for the lower set of wires 386. Apart from being divided into two chambers with two sets of different coated wires in the upper and lower portions 378 and 380 of the reaction chamber 376, the chamber of FIG. 19 is generally similar in configuration to that of FIG. 17.

With regard to the nature of the coating on the wires 384 and 386, the upper wires 384 are coated as described above in connection with FIG. 17 to produce ultraviolet radiation.

The lower set of wires 386, however, are coated to provide strong output radiation in the infrared radiation spectrum, as disclosed hereinabove in connection with examples A, B, and C. Accordingly, the arrangement of FIG. 19 is organized to provide powerful radiation in portion 380 which will impinge vigorously on the feedstock and provide an initial very substantial dissociative effect on the water vapor. Then, in the upper portion 378 of the reaction chamber the dissociation of the water vapor is continued, but at a frequency in the near ultraviolet range which is clearly at a frequency spectrum with respect to the hydrogen peroxide, $H_2O_2$, product gas which will not adversely affect or dissociate it. The combined effect of the two stage radiation chamber with different radiation frequencies being employed in each of the two chambers, is such as to maximize the production of the desired output gas.

Of course, in connection with FIGs. 16 through 21, two specific examples of reaction chamber arrangements employing radiation to produce desired product gases have been set forth. It is to be understood that through the examination of the spectral absorption characteristics of the feedstocks and products, and by suitably providing radiation within the reaction chamber matched to the characteristics of the feedstock and the product, many other similar combinations may be developed by those skilled in the art.

It is also particularly to be noted that through the use of coated wires, the amount of initial heat input required to raise the reaction chamber to operating temperature conditions, is greatly reduced.

For completeness, one set of dimensions for the wires 326, 384 and 386 will now be given. The overall diameter of the coated wires may be 0.00257 inch, and the diameter of the inner metal wire is 0.00157 inch with the coating being about 0.0005 inch thick, adding about one-thousandth of an inch to the diameter. The inner metal wires may, for example, be made of tungsten or other metal having a relatively high melting point and adequate strength at 1,000° Kelvin.

FIGs. 22 and 23 show an alternative arrangement for applying high frequency radiation to feedstock supplied to a reaction chamber. In FIG. 22 the reaction chamber per se is made up of two hemispheres 402 and 404 which are secured together by bolts 406 which extend through the mating flanges 408 and 410 of the hemispheres 402 and 406. An outer sheet metal housing 412 is provided to enclose the unit and to support the various enclosed elements of the system. Thus, for example, the hemispheres 402 and 404 are supported from brackets 414 secured to the housing 412. Between the reaction chamber 402, 404 and the housing 412 is suitable insulation for 416 of the ceramic foam insulation type.

Feedstock is supplied to the reaction chamber 402, 404 through input pipe 418, and product gases are withdrawn from the reaction chamber through pipe 420.

Input radiation is supplied to the reaction chamber 402, 404 through the window 422 which may, for example, be made of high temperature resistant quartz glass.

FIG. 23 is taken along line 23–23 of FIG. 22. Shown to advantage in FIG. 23 are the two lasers 424 and 426 which direct coherent radiation of different colors through the window 422 into the reaction chamber 402, 404 which has a highly polished interior surface. One of the lasers 424, 426 is a ruby laser with output radiation in the red spectral region, while the other laser is an yttrium aluminum garnet, or Yag laser with output radiation in the green frequency band. These lasers are directed at an acute angle through the window 422 so that the radiation of the two lasers beat to produce a higher frequency in the ultraviolet spectrum, as discussed and developed hereinabove in connection with the radiation from the wires of FIGS. 17 and 19. Accordingly, the feedstock supplied to the reaction chamber through the pipe 418 will be irradiated not only with the red and green direct laser illumination, but also by the beat frequencies which arise when the red and green radiation impinge on the discontinuities provided by the feedstock materials supplied to the chamber.

It may also be noted that in all of the embodiments decribed herein, where additional oxygen is supplied, and hydrogen peroxide, or $H_2O_2$, is formed, this reaction is exothermic and supplies heat to the reaction chamber. This factor is useful in increasing the efficiency of the processes, and contributes to the self-sustaining nature of the processes, as discussed above.

On a general basis, the processes described herein provide a mechanism for the transformation of low grade thermal radiation into specific coupled modes of intense monochromatic radiation providing new higher frequencies and shorter wavelengths with considerably increased power.

The energy change is accomplished through the creation of controlled spatial harmonics beating together while passing through media discontinuities within a non-linear medium. The effect is much like a parametric amplifier which controls the disposition of the electromagnetic energy conveyed by the waves. On a comprehensive basis, the transformation of the broad black body radiation into specific monochromatic frequencies of high energy which are matched to the absorption bands of the feedstock and to the transmission bands of the product, make for process efficiencies which are extremely high.

With regard to the operating temperatures and pressures for the apparatus of FIGS. 16 through 19, and that of FIGS. 22 and 23, the temperatures and pressures are less critical than for the embodiments disclosed earlier in the present case. In general, in order to provide radiation in the desired spectral range the apparatus of FIGS. 16 through 19 should be operated at a temperature in the order of 1000° Kelvin; however, other temperatures may be employed which produce adequate radiation at the desired frequencies, and a departure of 100° or 200° above or below 1000° K. would be operative, it is expected, with radiation drop off toward the lower end of this temperature range and possible materials failure problems toward the upper end of the range. Concerning the embodiment of FIGS. 22 and 23, a lower temperature such as 250° F., above the boiling point for water at the pressure which is employed, would be adequate.

Concerning pressures, somewhat lower pressures are adequate, as compared with the embodiments involving the use of metallic oxides, and no change in pressure is needed. For the embodiments of FIGS. 22 and 23, a gauge pressure of 3 or 4 pounds would be adequate, although higher pressures of up to several hundred pounds, for example, could be employed where higher fuel gas reservoir pressures are desired. Similar pressure considerations are applicable to the apparatus of FIGS. 16 through 20.

In the foregoing spcification a number of examples of reactants, host/sensitizer combinations, and radiation frequencies have been set forth, and the principles for their selection to implement particular needs have been defined; accordingly, the scope of the present invention is not restricted to the specific illustrated example, but is to be defined only by the appended claims:

What is claimed is:

1. An apparatus for applying high frequency energy to a feedstock comprising:
    a reaction chamber;
    means for supplying feedstock to said reaction chamber, said feedstock having at least one predetermined energy absorption band;
    means for applying high intensity radiation to said reaction chamber, including means located within said reaction chamber for generating radiation within said absorption band by transitions from a predetermined excited energy state to a lower energy state, and associated means for raising said radiation generation means to an excited state; and
    means for supporting a large plurality of said radiation generating means within said reaction chamber to flood said reaction chamber with intense radiation at the frequency or frequencies corresponding to said energy level transitions, and alter the composition of said feedstock.

2. An apparatus as defined in claim 1 further comprising: insulation means enclosing said chamber.

3. An apparatus as defined in claim 1 further comprising means for operating said chamber at elevated temperature and pressure.

4. An apparatus as defined in claim 3 further comprising means for preheating said feedstock to a temperature substantially above the operating temperature of said chamber.

5. An apparatus as defined in claim 1 wherein said feedstock has a plurality of absorption bands, and wherein a plurality of different radiation generating means are provided for applying energy to said feedstock at a plurality of said absorption bands.

6. An apparatus as defined in claim 1 wherein said radiation generating means includes host and sensitizer means and a plurality of different host material means are provided for absorbing energy at various frequencies and for exciting said sensitizer material to radiate energy at different frequencies corresponding to the high absorption regions in the characteristic of said feedstock.

7. An apparatus as defined in claim 1 further comprising:
    means for supplying steam to said chamber as the feedstock; and
    means for supplying additional air to said chamber for combination with the released hydrogen to form hydrogen peroxide.

8. An apparatus as defined in claim 1 further including means for supplying water vapor at elevated pressure as said feedstock.

9. An apparatus as defined in claim 1 further comprising means for supplying said feedstock on a substantially continuous basis.

10. An apparatus as defined in claim 1 wherein said radiation applying means includes a plurality of conducting wires, and wherein host and sensitizer material are located on the outer surface of said wires.

11. An apparatus as defined in claim 1 further comprising:
    means for withdrawing product gas from said reaction chamber, and wherein said product gas is substantially transparent to the radiation in said reaction chamber.

12. An apparatus as defined in claim 1 further including means for supplying water vapor to said reaction chamber as said feedstock, and further comprising means for supplying oxygen to said reaction chamber to form hydrogen peroxide.

13. An apparatus as defined in claim 1 wherein said radiation applying means is a series of wires coated with host and sensitizer material.

14. An apparatus as defined in claim 1 wherein said radiation applying means includes means applying at least two narrow bands of intense high frequency radiation.

15. An apparatus as defined in claim 1 wherein said means for applying high intensity radiation to said reaction chamber includes resistive wires, and host and sensitizer material coated on said wires.

16. An apparatus as defined in claim 15 further comprising means for heating said wires.

17. An apparatus as defined in claim 1 wherein two different radiation generation means are provided for generating intense high frequency energy at two respectively different frequencies.

18. An apparatus as defined in claim 17 wherein said reaction chamber has an input section and an output section, and wherein means are provided for applying said high frequency energy of said two different frequencies to said input and output sections, respectively.

19. An apparatus as defined in claim 1 wherein said means for supplying feedstock to said reaction chamber constitutes means for supplying water vapor to said reaction chamber; and further comprising means for supplying additional air to said reaction chamber to form hydrogen peroxide and concurrently supply heat to said reaction chamber; and means for drawing off product fuel gases including hydrogen peroxide from said reaction chamber.

20. An apparatus for applying high frequency energy to a feedstock comprising:
   a reaction chamber;
   means for supplying feedstock to said reaction chamber; said feedstock having a predetermined absorption characteristic and said feedstock constituting a discontinuous medium within said radiation chamber;
   means applying high intensity radiation to said reaction chamber at a first frequency; and
   means applying high intensity radiation to said reaction chamber at a second frequency wherein the sum of said first frequency and said second frequency is a predetermined third frequency which is generated when said radiation impinges on said feedstock, and wherein said feedstock has a high absorption characteristic for radiation of said third frequency, whereby said feedstock absorbs a substantial portion of the radiation which is generated as the sum of said first and second frequencies.

21. An apparatus as defined in claim 20 wherein said third frequency is in the ultraviolet frequency range.

22. An apparatus for applying high frequency energy to a feedstock as set forth in claim 20 wherein said means for applying high intensity radiation to said reaction chamber includes first and second sources of laser radiation operating at respectively different frequencies and radiating into said reaction chamber.

23. A process for applying high frequency energy to a feedstock comprising:
   supplying feedstock to a reaction chamber;
   applying high intensity radiation at a first frequency to said reaction chamber;
   applying additional high intensity irradiation to said reaction chamber at a second frequency to beat with said first frequency radiation in the presence of discontinuities in said reaction chamber created by the presence of said feedstock to generate a third frequency lying in the ultraviolet frequency band which is the sum of the frequency of said first radiation and the frequency of said second radiation; and
   drawing off product gas from said reaction chamber.

24. A process as defined in claim 23 wherein said feedstock is water vapor and further comprising the step of supplying additional air to the reaction chamber to form hydrogen peroxide, and to thereby supply heat to said reaction chamber.

25. An apparatus for forming hydrogen peroxide comprising:
   a reaction chamber;
   high frequency radiation means mounted within said reaction chamber for forming gaseous hydrogen from steam at an elevated temperature within said reaction chamber;
   means for supplying air for combination with the gaseous hydrogen to form $H_2O_2$, and
   means for applying the heat generated as said hydrogen peroxide is formed toward maintaining said reaction chamber at an elevated temperature.

26. A process for applying high frequency energy to feedstock comprising:
   supplying feedstock to a reaction chamber having an input section and an output section, said feedstock having predetermined absorption bands;
   supplying high intensity radiation at a first frequency within at least one absorption band of said feedstock to the input section of said reaction chamber to dissociate at least a portion of the feestock supplied to said radiation chamber and to form desired product gas; and
   supplying high intensity radiation to the output section of said reaction chamber at a second frequency within another absorption band of said feedstock and to which said product gas is transparent, said second frequency being significantly different from said first frequency, to complete the desired reaction.

27. An apparatus for generating hydrogen from water vapor comprising:
   a reaction chamber;
   means for supplying water vapor to said reaction chamber, said water vapor having predetermined energy absorption band or bands;
   means for supplying high intensity radiation to said reaction chamber, including means located within said reaction chamber for generating radiation at one or more selected narrow frequency bands within said absorption band;
   means for supplying energy to excite said radiation generation means;
   meand for supporting a plurality of said radiation generating means within said reaction chamber to flood said reaction chamber which intense radiation within said absorption band or bands to split said water vapor into hydrogen and oxygen; and
   means for drawing off hydrogen and or hydrogen peroxide from said reaction chamber.

28. An apparatus as defined in claim 27 wherein said radiation supplying means includes means for generating high frequency radiation at two distinct high frequencies.

29. An apparatus as defined in claim 27 further comprising means for supplying air to said reaction chamber to increase the formation of hydrogen peroxide.

30. An apparatus for applying high frequency energy to a feedstock comprising:
   a reaction chamber;
   means for supplying feedstock to said reaction chamber;
   means applying high intensity radiation to said reaction chamber at a first frequency;
   means applying high intensity radiation to said reaction chamber at a second frequency to beat with said first frequency radiation in the course of interacting with media discontinuities within the nonlinear medium formed by said feedstock within said reaction chamber; and
   said means for supplying high intensity radiation to said reaction chamber at said first and second frequencies constituting conducting wires coated with host and sensitizer material.

31. A method for applying high frequency energy to a feedstock comprising the steps of:
   supplying water vapor to a reaction chamber;

applying high intensity radiation in an absorption band of said water vapor to said reaction chamber to dissociate said water vapor, by heating wires coated with host and sensitizer material to an elevated temperature;

supplying additional air to said reaction chamber to form hydrogen peroxide and concurrently supply heat to said reaction chamber; and drawing off product gases including hydrogen peroxide from said reaction chamber.

32. An apparatus for generating hydrogen and/or hydrogen peroxide exothermically comprising:

a reactant comprising a metal or oxide thereof, said metal having a plurality of oxidation states, said reactant being capable above a predetermined elevated temperature and a predetermined elevated pressure of sequestering oxygen from steam and releasing hydrogen gas exothermically, with the production of a predetermined amount of heat, and capable of releasing oxygen in the absence of significant levels of gaseous oxygen with heat input less than said predetermined amount of heat;

means for heating said reactant and maintaining said reactant above said predetermined elevated temperature and above the atmospheric pressure disproportionation temperature for oxygen for at least one of said oxidation states;

means for applying water vapor at said predetermined elevated pressure to said reactant; said water vapor having a predetermined energy absorption versus frequency characteristics;

sensitizer material located in proximity to said reactant and exposed to said water vapor, and having an energy output characteristic when in the excited state which corresponds to at least one energy absorption region of said water vapor;

host material associated with said sensitizer material for absorbing energy from said reactant and for exciting said sensitizer, whereby the broad radiation versus frequency spectrum of said reactant is concentrated and applied to said water vapor in the absorption band or bands of said water vapor;

means for drawing off the hydrogen and/or hydrogen peroxide released when said reactant sequesters oxygen from said water vapor, and when molecules of water vapor are split up by radiant energy from said sensitizer material;

means for terminating the application of water vapor to said reactant;

means for terminating the drawing off of hydrogen and/or hydrogen peroxide obtained by the sequestering of oxygen from said water vapor;

means for removing the gaseous oxygen and other residual gases from the vicinity of the reactant and for disproportionating or dissociating the oxygen from the reactant;

means for supplying additional air to the vicinity of the hydrogen gas being formed to combine with the hydrogen to form hydrogen peroxide;

means for establishing spaces in the vicinity of said heated reactant;

means for directing said feedstock through said spaces; and means for locating said host material and said sensitizer material along the boundaries of said spaces.

* * * * *